US010148866B2

(12) United States Patent
Miyazawa

(10) Patent No.: US 10,148,866 B2
(45) Date of Patent: Dec. 4, 2018

(54) IMAGING DEVICE AND IMAGING METHOD

(71) Applicant: Olympus Corporation, Hachioji-shi, Tokyo (JP)

(72) Inventor: Shingo Miyazawa, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/624,911

(22) Filed: Jun. 16, 2017

(65) Prior Publication Data
US 2017/0289439 A1  Oct. 5, 2017

Related U.S. Application Data

(63) Continuation of application No. PCT/JP2015/059192, filed on Mar. 25, 2015.

(30) Foreign Application Priority Data

Dec. 19, 2014 (JP) ................................ 2014-257692

(51) Int. Cl.
*H04N 5/232* (2006.01)
*G03B 13/36* (2006.01)
(52) U.S. Cl.
CPC ......... *H04N 5/23212* (2013.01); *G03B 13/36* (2013.01); *H04N 5/23293* (2013.01)
(58) Field of Classification Search
CPC . H04N 5/23212; H04N 5/23292; G03B 13/36
See application file for complete search history.

(56) References Cited

U.S. PATENT DOCUMENTS 5,003,339 A * 3/1991 Kikuchi ............. H04N 5/23212
348/347
9,131,145 B2 * 9/2015 Hamano ............ H04N 5/23219
(Continued)

FOREIGN PATENT DOCUMENTS

JP 06-038089 2/1994
JP 06-046310 2/1994
(Continued)

OTHER PUBLICATIONS

Translation of the International Preliminary Report on Patentability ("IPRP"), including the Written Opinion of the International Searching Authority, to corresponding International Application No. PCT/JP2015/059192, dated Jun. 29, 2017 (6 pgs.).
(Continued)

*Primary Examiner* — Shahbaz Nazrul
(74) *Attorney, Agent, or Firm* — John C. Pokotylo; Pokotylo Patent Services

(57) ABSTRACT

An imaging device includes an imaging section, an image capture optical system, and a controller. The controller sets in an image a first focus adjustment region, which is a target of adjustment of focusing conditions, and a second focus adjustment region, which has a lower priority of adjustment of focusing than the first focus adjustment region. The controller performs focus adjustment based on the image data in the second focus adjustment region, if focus adjustment based on the image data in the first focus adjustment region is difficult. If the focus adjustment based on the image data in the first focus adjustment region is not difficult, while performing the focus adjustment based on the image data in the second focus adjustment region, the controller performs the focus adjustment based on the image data in the first focus adjustment region.

5 Claims, 22 Drawing Sheets

(56) References Cited

U.S. PATENT DOCUMENTS

| | | | | |
|---|---|---|---|---|
| 2007/0263997 A1* | 11/2007 | Hirai | ............... | G03B 13/36 |
| | | | | 396/123 |
| 2008/0159727 A1* | 7/2008 | Hamamura | ............ | G02B 7/102 |
| | | | | 396/104 |
| 2009/0244312 A1 | 10/2009 | Nakagawa | | |
| 2014/0105454 A1* | 4/2014 | Yoneyama | ......... | G06K 9/00664 |
| | | | | 382/103 |
| 2014/0176783 A1* | 6/2014 | Shibagami | ......... | H04N 5/23212 |
| | | | | 348/349 |
| 2016/0073006 A1* | 3/2016 | Funamoto | .......... | H04N 5/23212 |
| | | | | 348/345 |

FOREIGN PATENT DOCUMENTS

| | | |
|---|---|---|
| JP | 2008-165044 | 7/2008 |
| JP | 2009-069696 | 4/2009 |
| JP | 2012-013809 | 1/2012 |
| JP | 2012-123324 | 6/2012 |

OTHER PUBLICATIONS

International Search Report to corresponding PCT Application Serial No. PCT/JP2015/059192, dated Jun. 23, 2015 (3 pgs.), with translation (2 pgs.).
Supplementary European Search Report with cover page and Annex to the European Search Report to corresponding European Application No. 15869571.8, dated Jul. 24, 2018 (8 pgs.).

\* cited by examiner

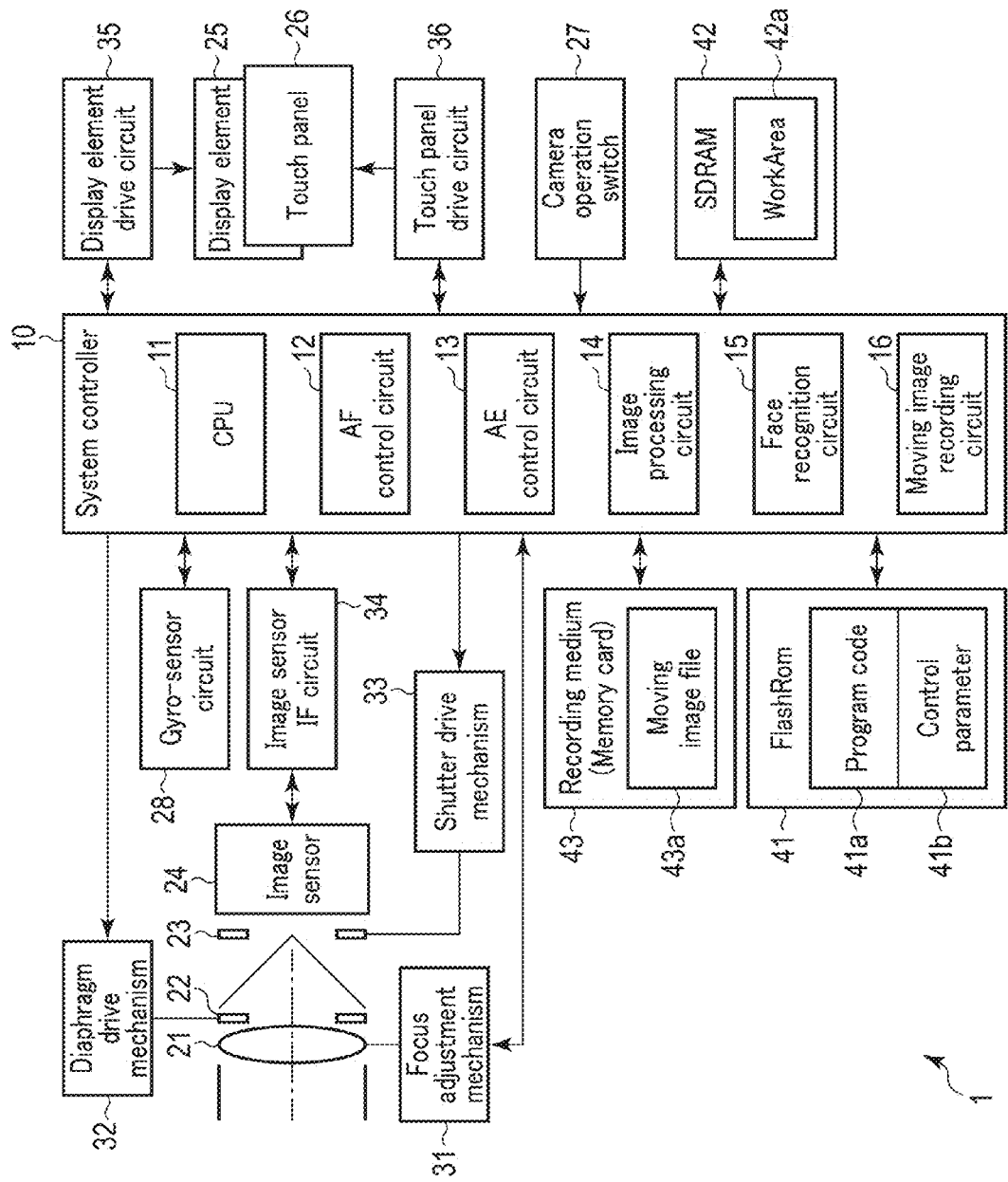
F I G. 1

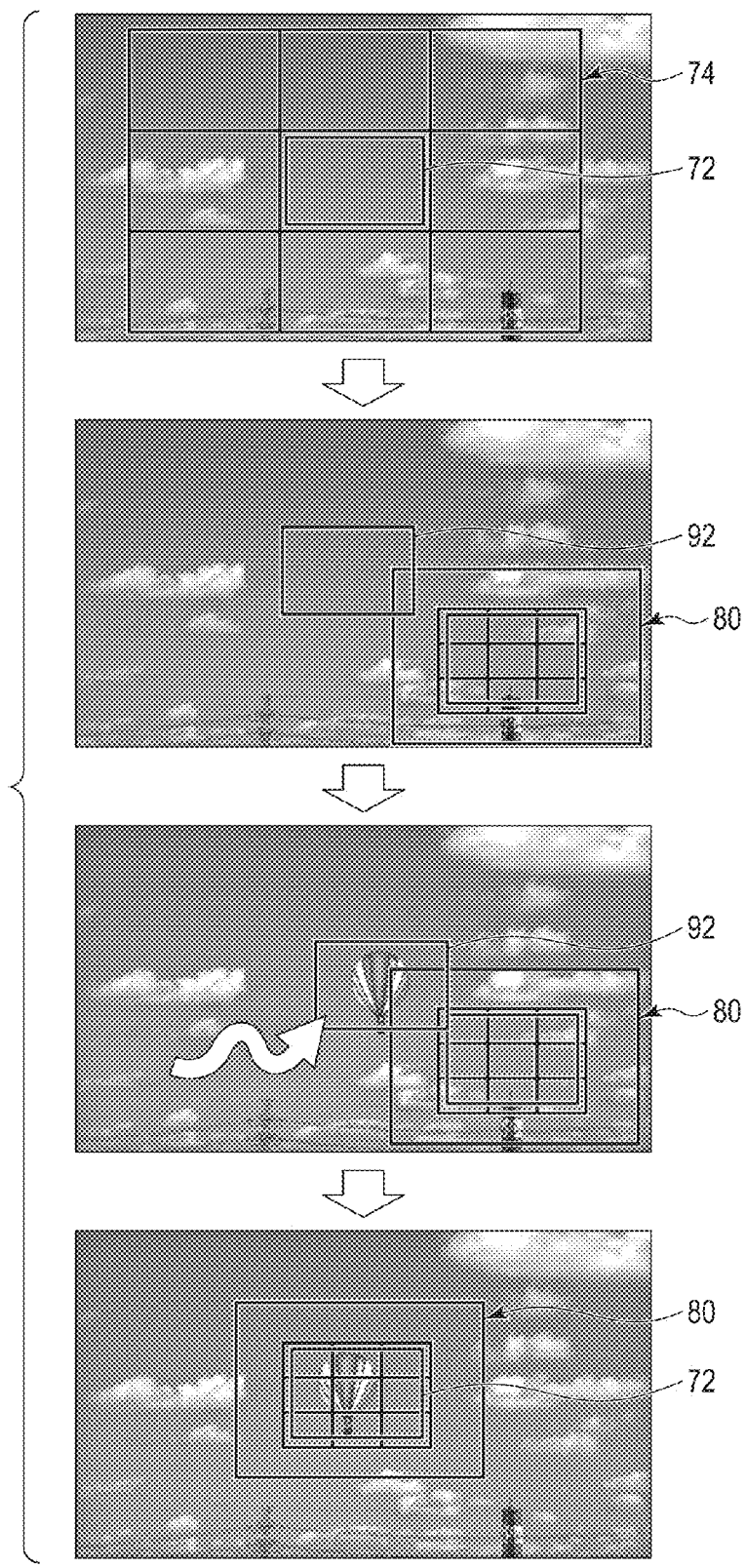
F I G. 3

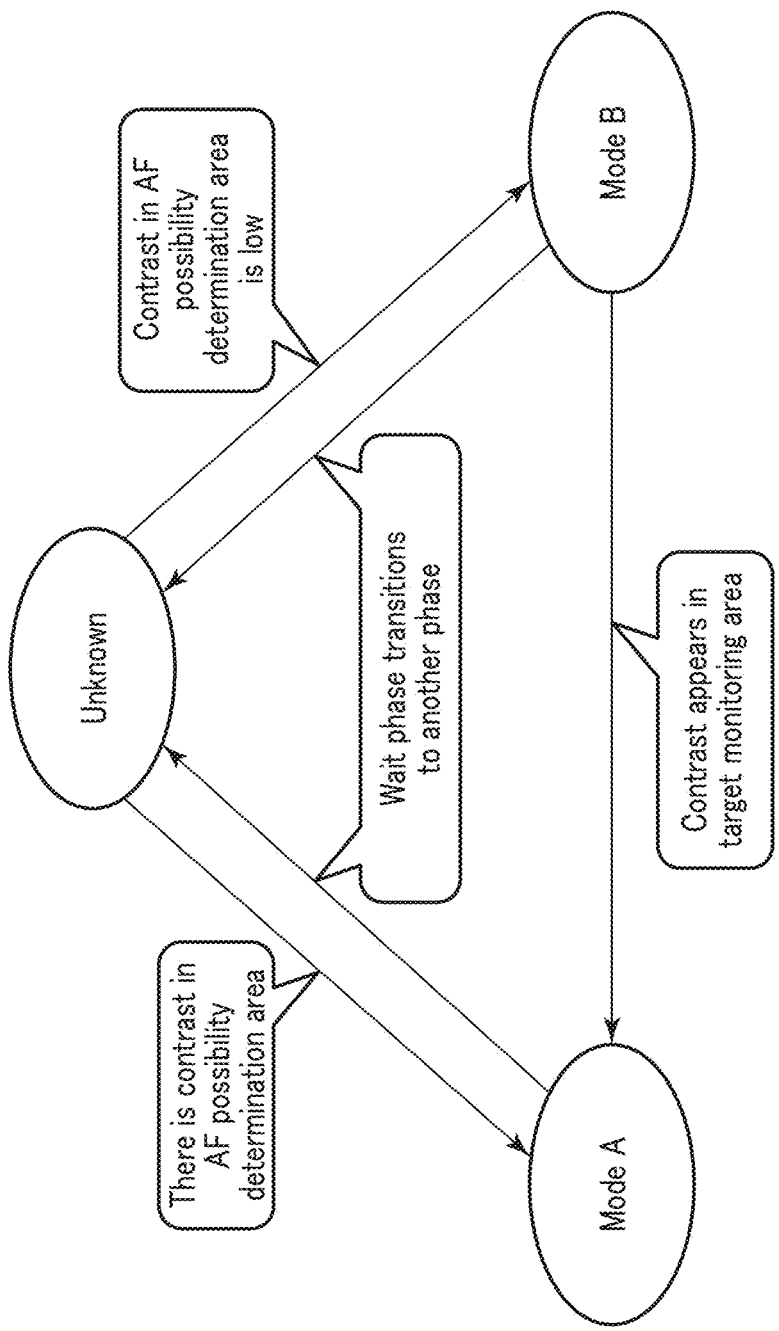
F I G. 16

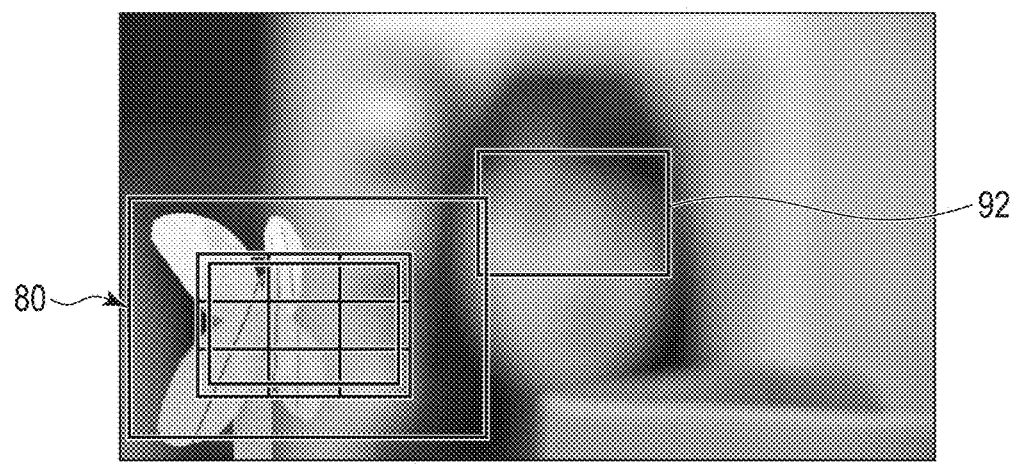
F I G. 22

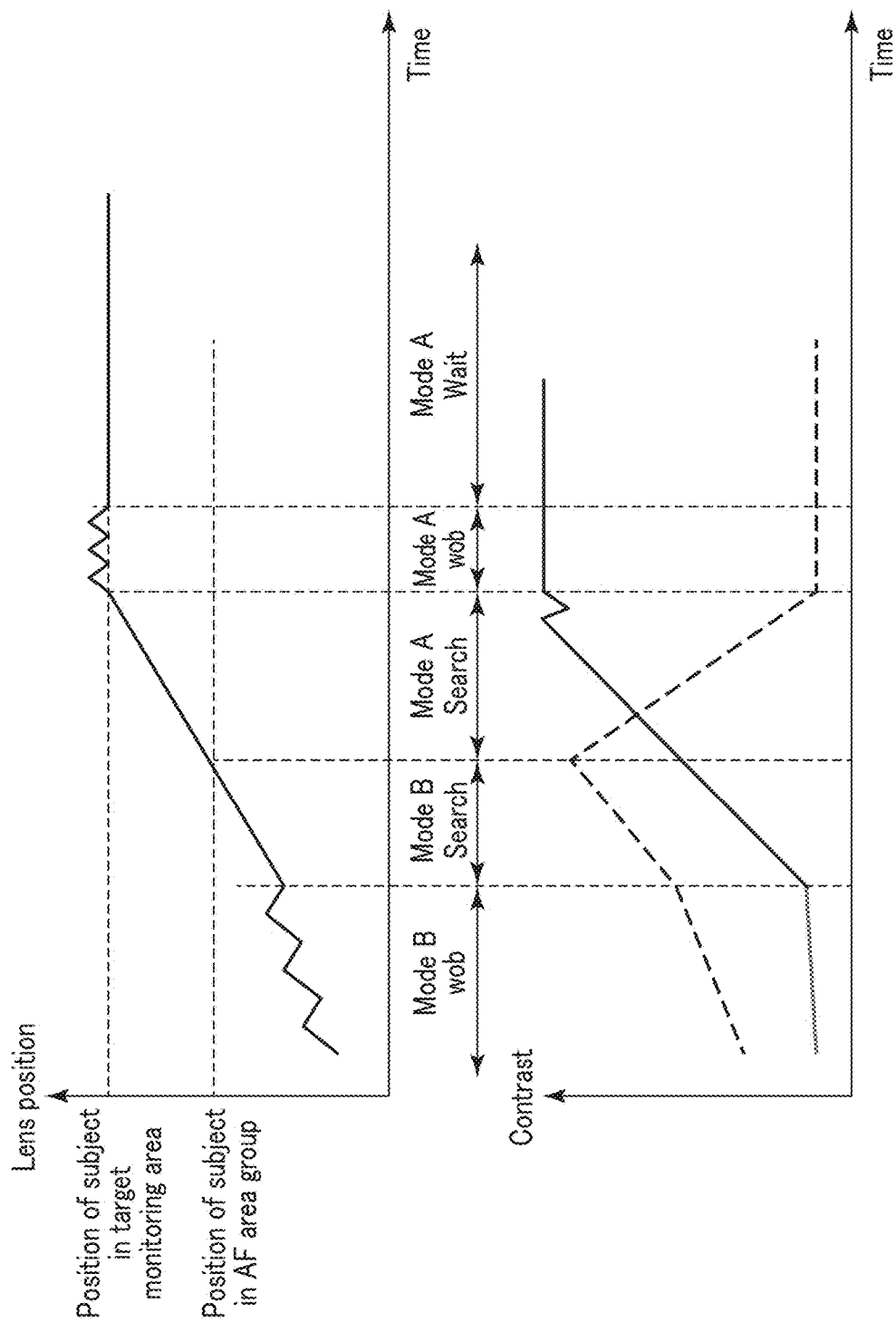
F I G. 24

IMAGING DEVICE AND IMAGING METHOD

CROSS-REFERENCE TO RELATED APPLICATIONS

This application is a Continuation Application of PCT Application No. PCT/JP2015/059192, filed Mar. 25, 2015 and based upon and claiming the benefit of priority from prior Japanese Patent Application No. 2014-257692, filed Dec. 19, 2014, the entire contents of all of which are incorporated herein by reference.

BACKGROUND OF THE INVENTION

1. Field of the Invention

The present invention relates to an imaging device and an imaging method.

2. Description of the Related Art

Generally, imaging devices having an autofocus function are known. As one of methods for achieving autofocus, a method utilizing a change in contrast in accordance with a focusing condition is known. In such a method, for example, if a subject has low contrast, it may be difficult to focus the subject. There are a variety of known techniques that are devised to perform accurate focusing for a subject that is difficult to focus, for example, a subject with low contrast.

For example, Jpn. Pat. Appln. KOKAI Publication No. 2009-069696 discloses the following technique. In an image obtained by image capture, a main region that is to be focused and a plurality of sub-regions around the main region are set. If it is difficult to perform focusing in the main region, a focusing control is performed by using information on focusing conditions in the sub-regions in addition to information on focusing conditions in the main region.

Furthermore, for example, Jpn. Pat. Appln. KOKAI Publication No. 2008-165044 discloses the following technique. Focusing detection regions are arranged in a central portion and peripheral portions of a captured image. It is determined whether or not the subject is a flat object based on focusing evaluation values in the central and peripheral portions. When the subject is a flat object, a focusing operation is performed based on the focusing evaluation values in the central and peripheral portions. When the subject is not a flat object, a focusing operation is performed based on the focusing evaluation value in the central portion.

In particular, in an imaging device to capture moving images, if a focus position changes, the state of changing will be recorded as a moving image. Therefore, in an autofocus operation when a moving image is captured, it is desirable that a rapid movement or unnecessary movement of a focus lens should not occur.

BRIEF SUMMARY OF THE INVENTION

According to an aspect of the invention, an imaging device includes an imaging section that receives a subject image to capture, and generates image data; an image capture optical system that forms the subject image on an imaging surface of the imaging section and includes a focus lens for focus adjustment; and a controller that controls movement of the focus lens based on the image data and performs a focus adjustment operation, wherein the controller sets in an image represented by the image data a first focus adjustment region, which is a target of adjustment of focusing conditions, and a second focus adjustment region, which is a target of adjustment of focusing conditions and has a lower priority of adjustment of focusing than the first focus adjustment region; the controller determines whether or not focus adjustment based on image data in the first focus adjustment region is difficult; the controller performs focus adjustment based on image data in the second focus adjustment region, if the focus adjustment based on the image data in the first focus adjustment region is difficult; the controller repeatedly determines whether or not the focus adjustment based on the image data in the first focus adjustment region is difficult, while performing the focus adjustment based on the image data in the second focus adjustment region; and the controller stops the focus adjustment based on the image data in the second focus adjustment region and performs the focus adjustment based on the image data in the first focus adjustment region, if the focus adjustment based on the image data in the first focus adjustment region is not difficult.

According to an aspect of the invention, an imaging method is a method using an imaging device comprising an imaging section that receives a subject image to capture, and generates image data, an image capture optical system that forms the subject image on an imaging surface of the imaging section and includes a focus lens for focus adjustment, and a controller that controls movement of the focus lens based on the image data and performs a focus adjustment operation. The method includes setting in an image represented by the image data a first focus adjustment region, which is a target of adjustment of focusing conditions, and a second focus adjustment region, which is a target of adjustment of focusing conditions and has a lower priority of adjustment of focusing than the first focus adjustment region; determining whether or not focus adjustment based on image data in the first focus adjustment region is difficult; performing focus adjustment based on image data in the second focus adjustment region, if the focus adjustment based on the image data in the first focus adjustment region is difficult; repeatedly determining whether or not the focus adjustment based on the image data in the first focus adjustment region is difficult, while performing focus adjustment based on the image data in the second focus adjustment region; and stopping the focus adjustment based on the image data in the second focus adjustment region and performs the focus adjustment based on the image data in the first focus adjustment region, if the focus adjustment based on the image data in the first focus adjustment region is not difficult.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a schematic block diagram showing a configuration example of an imaging device according to an embodiment of the present invention.

FIG. 3 is a view for explaining an autofocus function of the imaging device according to the embodiment.

FIG. 16 is a diagram for explaining an outline of a state transition of area location modes.

FIG. 22 is a view for explaining an effect of the change detection processing etc.

FIG. 24 is a view for explaining an effect of the change detection processing etc.

DETAILED DESCRIPTION OF THE INVENTION

Figure 2:
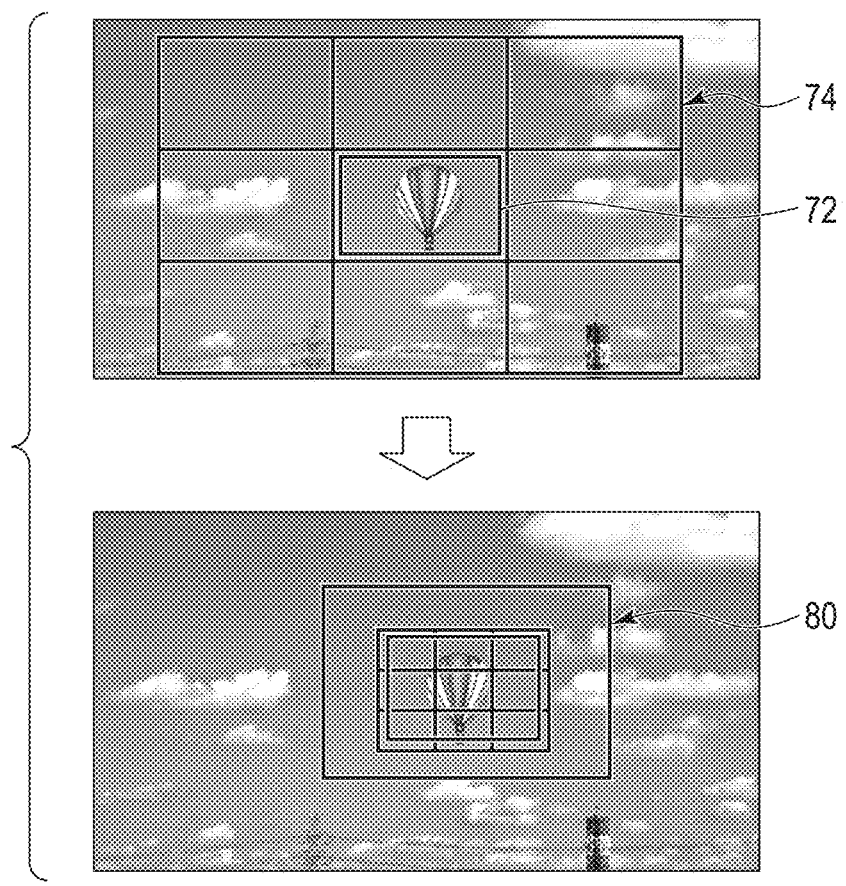
FIG. 2 is a view for explaining an autofocus function of the imaging device according to the embodiment.

An embodiment of the present invention will be explained with reference to the drawings. In the imaging device of the embodiment, satisfactory moving image AF is performed. Moving image AF means continuous AF, which is aimed at continuously focusing a subject during moving image recording. In the moving image AF, since lens movement is recorded in the moving image product, importance is placed on high visual quality of the recorded moving image. The following are conditions of moving image AF for high visual quality. When a focus position is being changed, an operation that may considerably change the in-focus position should not be made. AF should be stable while the imaging device is performing a panning or tilting operation. An operation such as hunting should not occur due to failure to focus by AF. A rapid operation should not be hastily performed. Thus, moving image AF requires "stability". A quick and rapid operation, which is required for AF in capturing a still image, is not preferable in moving image AF. In moving image AF, "steady" and "gradual" focusing operations are preferable. However, since the imaging device is required to continuously focus on the subject, of course both stability and tracking performance need to be achieved.

FIG. 1 shows an outline of a configuration example of an imaging device 1 according to the embodiment. As shown in FIG. 1, the imaging device 1 includes a system controller 10 that controls an operation in each of the sections of the imaging device 1.

The imaging device 1 comprises a lens group 21, a diaphragm 22, a shutter 23, an image sensor 24, a display element 25, a touch panel 26, a camera operation switch 27, a gyro-sensor circuit 28, a focus adjustment mechanism 31, a diaphragm drive mechanism 32, a shutter drive mechanism 33, an image sensor IF circuit 34, a display element drive circuit 35, and a touch panel drive circuit 36.

The lens group 21 includes a plurality of lenses. The lens group 21 includes a focus lens to adjust a focus. The focus lens moves in an optical axis direction, thereby adjusting a focus of a subject image formed on the image sensor 24. The diaphragm 22 adjusts the amount of the light that enters the image sensor 24 via the lens group 21. An optical system including the lens group 21, the diaphragm 22, etc. may be configured as an interchangeable lens which is attachable to and detachable from a main body of the imaging device 1. The shutter 23 is mounted in front of the image sensor 24, and controls the entrance of light into the image sensor 24 via the lens group 21. The image sensor 24 includes, for example, a CCD sensor or a CMOS sensor. The image sensor 24 generates an image signal by photoelectric conversion based on the subject image formed by the lens group 21.

The focus adjustment mechanism 31 moves the focus lens included in the lens group 21 in the optical axis direction to adjust the focus under control of the system controller 10. The diaphragm drive mechanism 32 drives the diaphragm 22 under control of the system controller 10. The shutter drive mechanism 33 drives the shutter 23 under control of the system controller 10. The image sensor IF circuit 34 reads the image signal from the image sensor, and image data converted to a digital signal is output to the system controller 10.

The display element 25 includes, for example, a liquid crystal display. The display element 25 displays various images, such as a live view image, a captured image, and an operation window. The touch panel 26 is provided on the display element 25 and acquires a touch input by the user. The display element drive circuit 35 controls a display operation by the display element 25 under control of the system controller 10. The touch panel drive circuit 36 controls a touch input acquiring operation by the touch panel 26 under control of the system controller 10.

The camera operation switch 27 includes, for example, a release switch, a record button, a cross-key to perform various input operations, etc. The camera operation switch 27 acquires an input by the user, and transmits the input to the system controller 10. The gyro-sensor circuit 28 detects a position of the imaging device 1. The gyro-sensor circuit 28 transmits information on the position of the imaging device 1 to the system controller 10.

The imaging device 1 comprises a flash ROM 41, an SDRAM 42, and a recording medium 43. The flash ROM 41 stores a program code 41a and a control parameter 41b to control operations of the imaging device 1, which are used by, for example, the system controller 10. The SDRAM 42 includes a Work Area 42a, which is a memory area for use in computations by the system controller 10. The recording medium 43 is attachable to and detachable from the imaging device 1, and stores still image data and a moving image file 43a captured by the imaging device 1.

The system controller 10 includes a central processing unit (CPU) 11, an AF control circuit 12, an AE control circuit 13, an image processing circuit 14, a face recognition circuit 15, and a moving image recording circuit 16.

The CPU 11 performs various computations using the program code 41a and the control parameter 41b stored in the flash ROM 41. The AF control circuit 12 performs various computations relating to autofocus (AF), and controls operations of the focus adjustment mechanism 31, etc. The AE control circuit 13 performs various computations relating to control of exposure, and controls operations of the diaphragm drive mechanism 32, the shutter drive mechanism 33, etc. The image processing circuit 14 performs image processing for image data generated by the image sensor 24 and acquired via the image sensor IF circuit 34. The face recognition circuit 15 performs face recognition processing for recognizing a face included in the subject imaged by the image sensor 24. The moving image recording circuit 16 records on the recording medium 43 moving image data generated by the image sensor 24, acquired via the image sensor IF circuit 34, and image-processed by the image processing circuit 14. Each of the AF control circuit 12, the AE control circuit 13, the image processing circuit 14, the face recognition circuit 15, the moving image recording circuit 16, etc. may be constituted by, for example, an application specific integrated circuit (ASIC) or the like.

As described above, for example, the image sensor 24 and the image sensor IF circuit 34 function as an imaging section that receives a subject image to capture and generates image data. Furthermore, for example, the lens group 21, the diaphragm 22, and the shutter 23 function as an image capture optical system that forms the subject image on an imaging surface of the imaging section and includes the focus lens for focus adjustment. Also, for example, the system controller 10 functions as a controller that controls movement of the focus lens based on the image data and performs a focus adjustment operation.

An outline of the autofocus (AF) operation by the imaging device 1 according to the embodiment will be described with reference to FIG. 2 and FIG. 3. In the imaging device 1 of this embodiment, the user can select an area to be focused by AF. The area selected by the user is referred to as an AF possibility determination area 72. As in a so-called all target mode, even if an AF area is not selected by the user but automatically selected by, for example, closest selection or the like, any one point can be treated as an AF possibility determination area. An upper view of FIG. 2 shows a case in which a central portion of an imaging area is selected as the AF possibility determination area 72. In the imaging device 1 of this embodiment, as shown in the upper view of FIG. 2, nine peripheral areas 74 are provided to cover the imaging area.

As shown in FIG. 2, if there is a high-contrast subject in the AF possibility determination area 72, in other words, if AF is easy in the AF possibility determination area 72, an AF area group 80 that includes a plurality of AF areas, where an analysis in AF operations is performed, is set in the AF possibility determination area 72 as shown in the lower view of FIG. 2. A state, in which the AF area group 80 is set in the AF possibility determination area 72 as described above, is referred to as a mode A.

On the other hand, if the contrast in the AF possibility determination area 72 is low, as shown in the view at the top of FIG. 3, in other words, if AF is difficult in the AF possibility determination area 72, the AF area group 80 is not set in the AF possibility determination area 72, but is set in an area of the nine peripheral areas 74 that includes a high-contrast subject, as shown in the second view from the top in FIG. 3. In the second view from the top in FIG. 3, the AF area group 80 is set in the lowest right peripheral area 74. At this time, a target monitoring area 92 to monitor appearance of a high-contrast subject is set in the AF possibility determination area 72. A state, in which the AF area group 80 is not set in the AF possibility determination area 72 as described above, is referred to as a mode B.

Thus, the AF possibility determination area 72 and the target monitoring area 92 correspond to a first focus adjustment region, which is a target of adjustment of focusing conditions. The peripheral areas 74 correspond to a second focus adjustment region that is a target of adjustment of focusing conditions and has a lower priority of adjustment of focusing than the first focus adjustment region.

As shown in a third view from the top in FIG. 3, when a high-contrast subject appears in the target monitoring area 92, the AF area group 80 is set in the target monitoring area 92, that is, the AF possibility determination area 72, as shown in a fourth view from the top in FIG. 3.

In the imaging device 1 of this embodiment, three phases are used as AF operation phases. Specifically, a wobbling phase (wob), a search phase (search), and a wait phase (wait) are used.

An AF operation performed in the wobbling phase will be described with reference to FIG. 4 and FIG. 5. In the wobbling phase, the focus lens is slightly driven alternately in a direction toward infinity and a direction toward a closest position frame by frame. During the slight driving, a center position of an amplitude is gradually moved, thereby performing fine adjustment of focusing and determining a direction of an in-focus position. This driving of the focus lens is referred to as wobbling drive (a wobbling operation).

Figure 4:
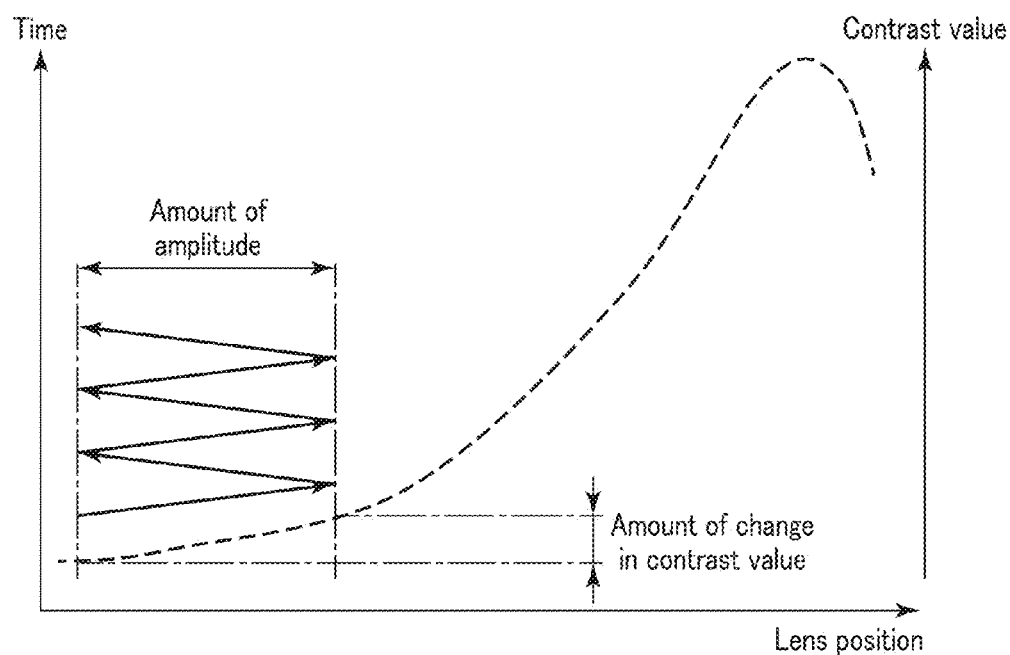
FIG. 4 is a diagram for explaining a wobbling drive for a focus lens.

FIG. 4 is a diagram for explaining a method of determining a direction toward an in-focus position by wobbling drive. In FIG. 4, a solid line represents a change in lens position relative to a passage of time, and a broken line represents a contrast value of an image obtained at the lens position. When the lens position moves in the direction toward infinity and the direction toward the closest position alternately as indicated by the solid lines in FIG. 4, the contrast value changes. Based on the change in contrast value, the direction toward the in-focus position can be determined. Of the direction toward infinity and the direction toward the closest position, a direction of increasing the contrast value is the direction toward the in-focus position.

The larger the amount of amplitude between lens positions in the direction toward infinity and the direction toward the closest position, the more easily the change in contrast value can be detected and the direction can be determined. On the other hand, if the amount of amplitude is relatively large, the movement of the focus lens recorded in a moving image is easily visible. Contrarily, if the amount of amplitude is relatively small, the movement of the focus lens recorded in a moving image is not easily visible, and the change in contrast value cannot be easily detected and the direction cannot be easily determined. In this embodiment, the amount of amplitude is appropriately adjusted depending on the subject and image capture conditions.

Figure 5:
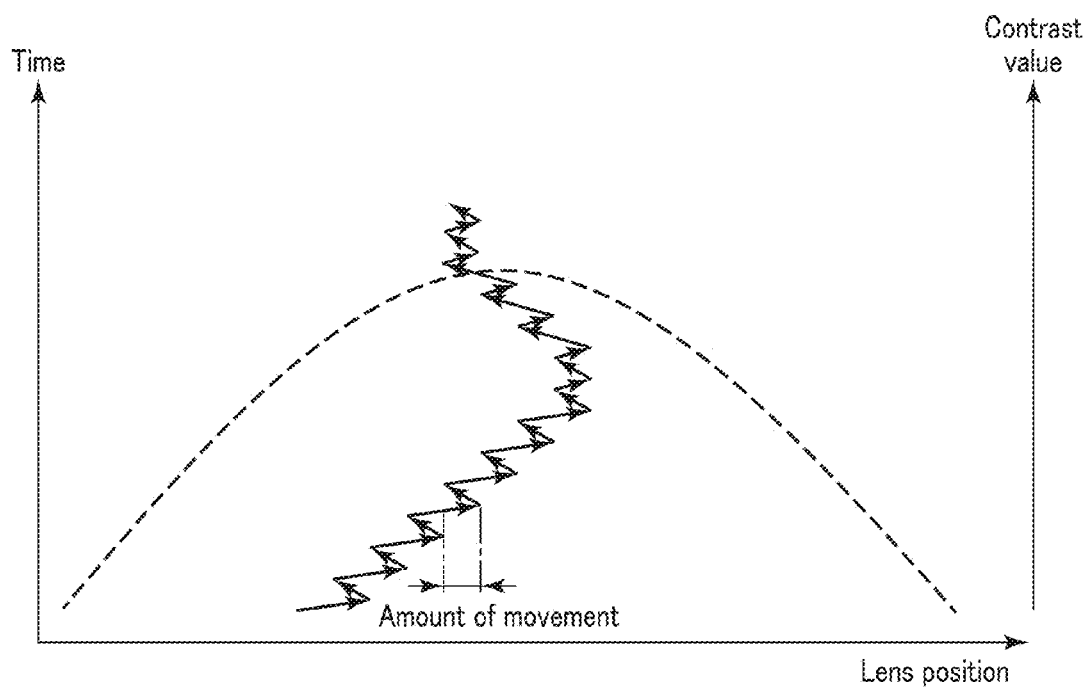
FIG. 5 is a diagram for explaining a wobbling drive for a focus lens.

FIG. 5 is a diagram for explaining a method of fine adjustment of focusing by a wobbling drive. In FIG. 5, a solid line represents a change in lens position relative to the passage of time, and a broken line represents a change in contrast value of an image obtained at the lens position. When fine focus adjustment is performed, a center position of an amplitude between lens positions moved in the direction toward infinity and the direction toward the closest direction is gradually moved as shown FIG. 5. This movement is carried out to maximize the contrast value based on information about the acquired contrast value. The focus is fine-adjusted by the movement. The greater the amount of movement, the sooner the focusing is achieved; however, unnecessary movement of the focus lens, which is recorded in a moving image, will easily occur. In contrast, the smaller the amount of movement, the longer time the focusing requires; however, unnecessary movement of the focus lens, which is recorded in a moving image, will not easily occur.

Figure 6:
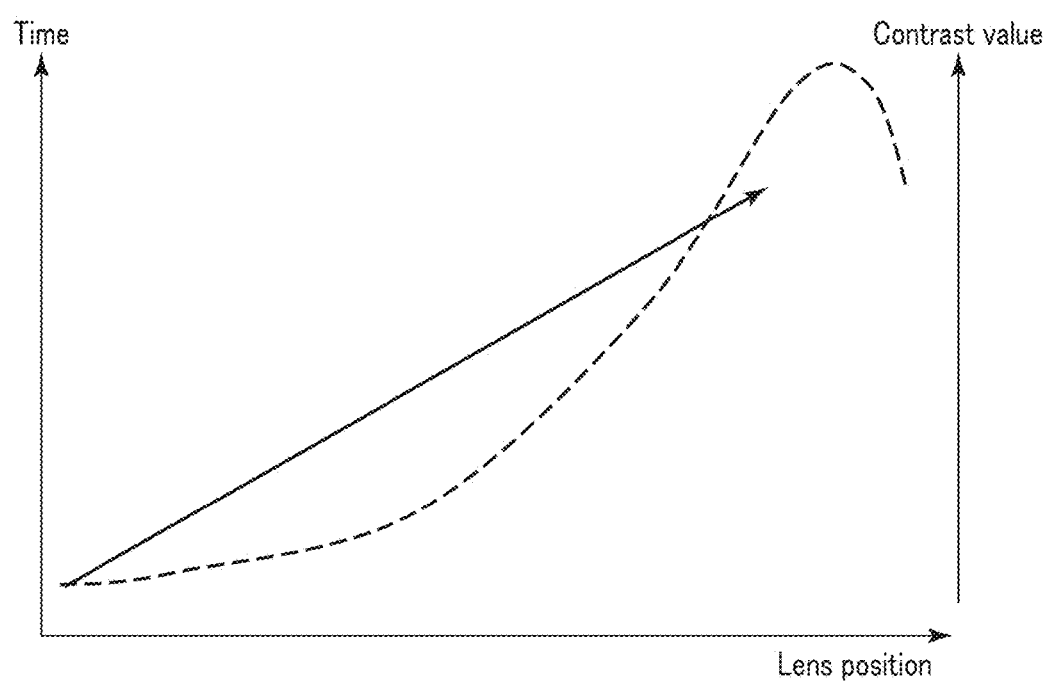
FIG. 6 is a diagram for explaining a scan drive for a focus lens.

An AF operation performed in the search phase will be described with reference to FIG. 6. In FIG. 6, a solid line represents a change in lens position relative to the passage of time, and a broken line represents a change in contrast value of an image obtained at the lens position. In the search phase, the focus lens continuously moves in one direction. This driving of the focus lens is referred to as a scan drive (a scan operation). When the focus lens is moved by the scan drive, the contrast value changes in accordance with a focusing condition. The in-focus position can also be searched for by the scan drive. The movement of the focus lens by the scan drive is faster than the movement of the focus lens by the wobbling drive.

Figure 7:
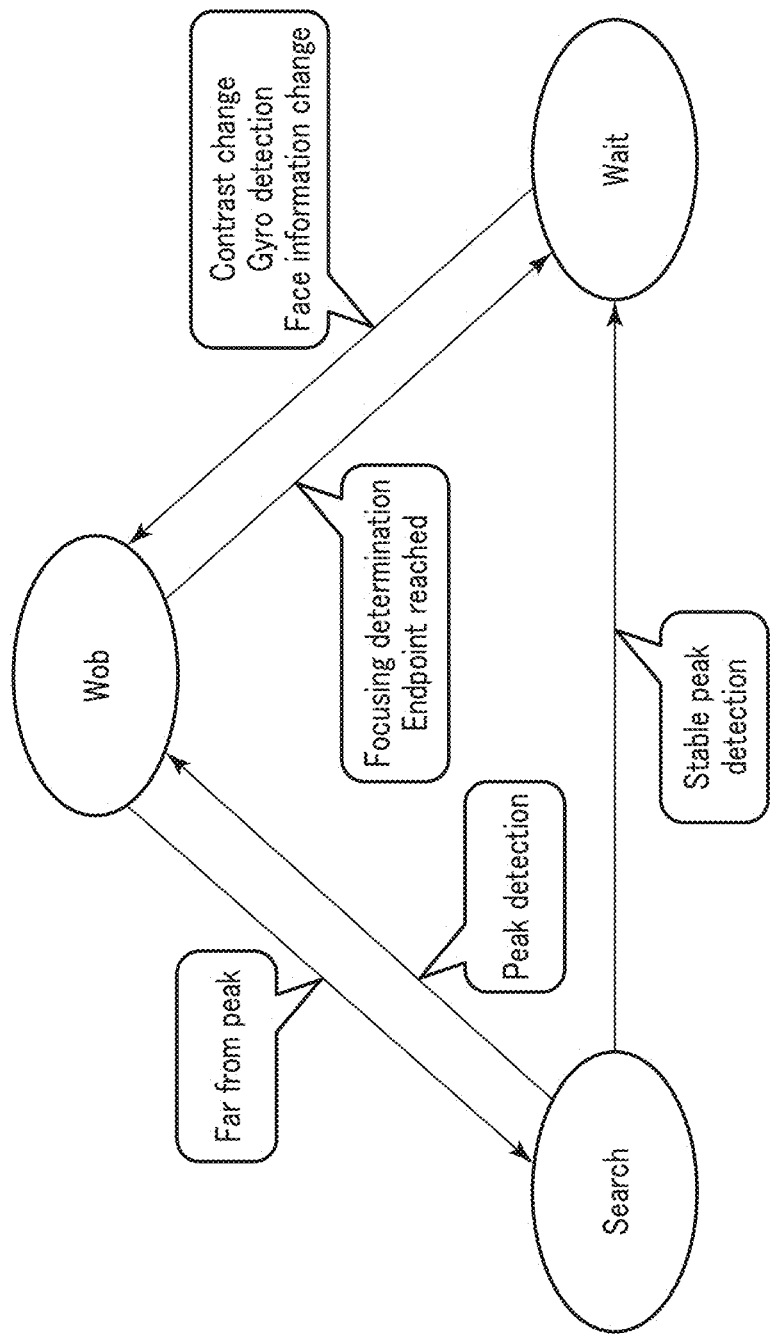
FIG. 7 is a diagram for explaining an outline of a state transition among a wob phase, a search phase, and a wait phase.

Transitions among control phases will be explained with reference to FIG. 7. As described above, the control phases of this embodiment include the wobbling phase (wob), the search phase (search), and the wait phase (wait). When moving image recording starts, the control starts from the wob. In the wob, when the lens position of the focus lens is determined to be far from the in-focus position, that is, the contrast value is far from a peak, the phase transitions to the search. Transition to the search causes the lens to quickly move to the in-focus position. In the wob, when the lens position is determined to be in the in-focus position, the phase transitions to the wait, and the lens drive is stopped.

In the search, when the lens position reaches the in-focus position, that is, the contrast value is determined to be at the peak, the phase transitions to the wob. At this time, the in-focus condition is maintained by the wobbling drive. On the other hand, in the search when the lens is in the in-focus position under stable conditions, in other words, when the contrast value is determined to be at the peak and stable, the phase transitions to the wait and the lens drive is stopped.

During the wait, when a movement of the imaging device 1 is detected by a gyro or the contrast value in the image, or face information is determined to be changed, the phase transitions to the wob and the wobbling operation is restarted to maintain the in-focus condition.

Figure 8:
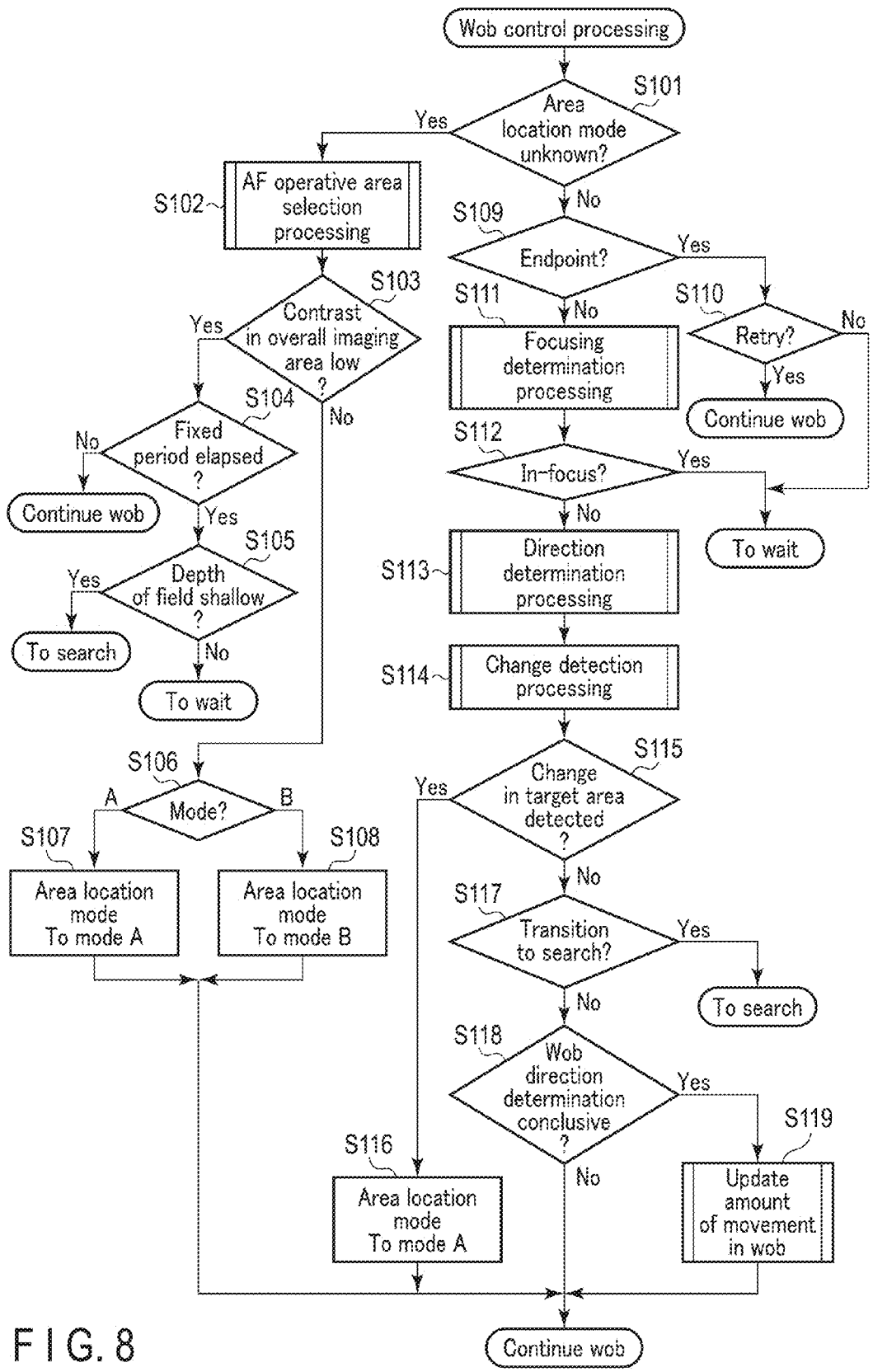
FIG. 8 is a flowchart showing an example of wob control processing.

Next, operations in the wob phase, the search phase, and the wait phase will be explained with reference to flowcharts. Moving image AF starts from the wob phase. An example of operations in wob control processing in the wob phase will be explained with reference to the flowchart in FIG. 8.

In step S101, the system controller 10 determines whether or not an area location mode is unknown. As described above, area location modes are: the mode A in which the AF area group 80 is set in the AF possibility determination area 72; and the mode B in which the AF area group 80 is set in any of the peripheral areas 74. When moving image AF starts and when the phase transitions from the wait phase to the wob phase, an area location mode is unknown. At this time, the area location mode is provisionally set in the same manner as the mode A. If the area location mode is unknown, the process proceeds to step S102.

Figure 9:
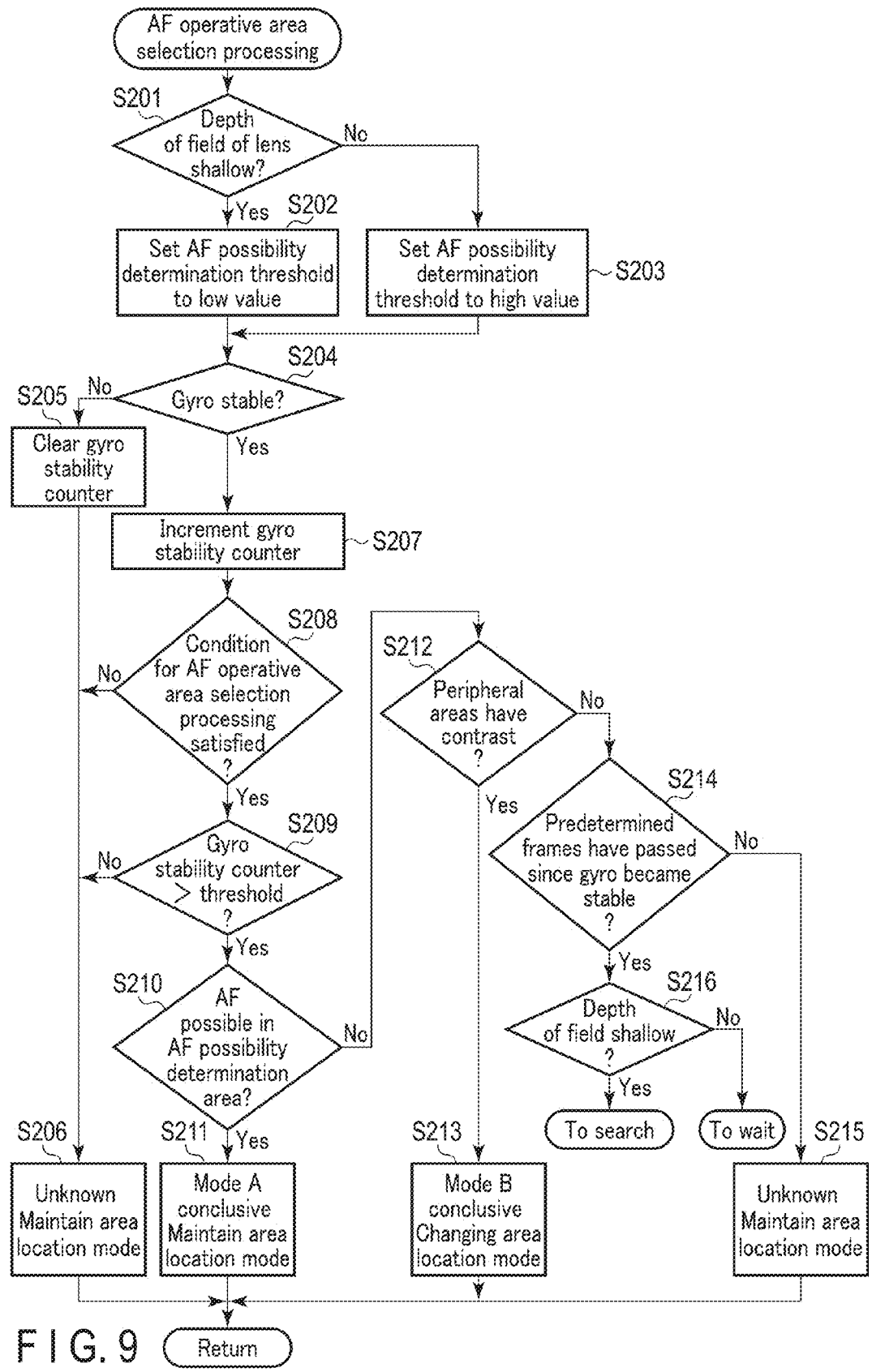
FIG. 9 is a flowchart showing an example of AF operative area selection processing.

In step S102, the system controller 10 performs AF operative area selection processing and sets the area location mode to the mode A or the mode B. The AF operative area selection processing is processing to determine whether there is a contrast in the AF possibility determination area 72, and to select an area of the peripheral areas 74 that has the highest contrast, if the contrast in the AF possibility determination area 72 is determined to be low. The AF operative area selection processing will be described with reference to the flowchart shown in FIG. 9.

In step S201, the system controller 10 determines whether or not a depth of field of the attached lens is shallow. If the depth of field is shallow, the process proceeds to step S202. In step S202, the system controller 10 sets an AF possibility determination threshold to a low value. Then, the process proceeds to step S204. In step S201, if the depth of field is determined to not be shallow, the process proceeds to step S203. In step S203, the system controller 10 sets an AF possibility determination threshold to a high value. Then, the process proceeds to step S204. As described above, if the depth of field of the attached lens is shallow, a setting is made so that the mode B using the peripheral areas 74 cannot be easily selected and the mode B using the AF possibility determination area 72 can be easily selected. A depth of focus or F number may be used instead of the depth of field. If the attached lens is an interchangeable lens, the system controller 10 acquires the depth of focus (the depth of field) or the F number through communication with the interchangeable lens.

In step S204, the system controller 10 acquires gyro output information from the gyro-sensor circuit 28 and determines whether or not the gyro output is stable. If the gyro output is not stable, the process proceeds to step S205. In step S205, the system controller 10 clears a gyro stability counter (hereinafter referred to as the gyro counter). Then, the process proceeds to step S206.

In step S206, the system controller 10 determines that the area location mode is unknown and maintains the area location mode without change. In other words, the area location mode is maintained at the provisionally set mode A. Then, the AF operative area selection processing is ended, and the process returns to the wob control processing.

In step S204, if the gyro output is determined to be stable, the process proceeds to step S207. In step S207, the system controller 10 increments the value of the gyro counter.

In step S208, the system controller 10 determines whether or not a condition for performing the AF operative area selection processing is satisfied. For example, setting is made so as not to perform the AF operative area selection processing under the condition that: the subject is a point light source; a face is detected by face detection processing to detect a face included in the image; a so-called digital teleconversion or movie teleconversion to cut out and enlarge a central portion of the image is performed; or the subject is being tracked in the image. If no condition for performing the AF operative area selection processing is satisfied, that is, the AF operative area selection processing described above is not performed, the process proceeds to step S206. If a condition for performing the AF operative area selection processing is satisfied, the process proceeds to step S209.

In step S209, the system controller 10 determines whether or not the gyro counter is greater than a predetermined threshold, that is, whether or not a longer period than a predetermined period has elapsed since the gyro became stable. If the gyro counter is not greater than the threshold, the process proceeds to step S206. In contrast, if the gyro counter is greater than the threshold, the process proceeds to step S210.

In step S210, the system controller 10 determines whether AF is possible in the AF possibility determination area 72. For example, when the AF evaluation value in the AF possibility determination area 72 is greater than the AF possibility determination threshold set in step S202 or step S203, it is determined that AF is possible. If AF is possible in the AF possibility determination area 72, the process proceeds to step S211.

In step S211, the system controller 10 determines that the area location mode is the mode A. In other words, the area location of the provisionally set mode A is maintained. Then, the AF operative area selection processing is ended, and the process returns to the wob control processing.

In step S210, if it is determined that AF is not possible in the AF possibility determination area 72, the process proceeds to step S212. In step S212, the system controller 10 determines whether the peripheral areas 74 include a high-contrast region. For example, if the AF evaluation value of any of the peripheral areas 74 is greater than the predetermined threshold, it is determined that the peripheral areas 74 include a high-contrast region. If it is determined that there is a high-contrast region, the process proceeds to step S213.

In step S213, the system controller 10 determines that the area location mode is the mode B. Then, the AF operative area selection processing is ended, and the process returns to the wob control processing.

In step S212, if it is determined that the peripheral areas 74 do not include a high-contrast region, the process proceeds to step S214. In step S214, the system controller 10 determines whether or not predetermined frames have passed since the gyro became stable. If it is determined that the predetermined frames have not passed, the process proceeds to step S215.

In step S215, the system controller 10 determines that the area location mode is unknown and maintains the area location mode without change. In other words, the area location mode is maintained at the provisionally set mode A. Then, the AF operative area selection processing is ended, the process returns to the wob control processing, and the AF operative area selection processing is performed again in the next frame.

In step S214, if it is determined that the predetermined frames have passed since the gyro became stable, the process proceeds to step S216. In step S216, the system controller 10 determines whether or not the depth of field is shallow. If the depth of field is shallow, it is considered that the amount of focus deviation is very large and the degree of blurring is high. At this time, the process transitions to the search control processing to be described later. If the depth of field is determined to not be shallow, it is considered that the contrast in the overall subject is low. At this time, the process transitions to the wait control processing to be described later.

Referring back to FIG. 8, explanations of the wob control processing will be continued. After the AF operative area selection processing in step S102, the process proceeds to step S103.

In step S103, the system controller 10 determines whether or not the contrast in an overall imaging area is low. If the contrast in the overall imaging area is low, the process proceeds to step S104. In step S104, the system controller 10 determines whether or not a predetermined period has elapsed. If not, the wob control processing is continued. In other words, the process returns to step S101. If the predetermined period has elapsed, the process proceeds to step S105.

In step S105, the system controller 10 determines whether or not the depth of field is shallow. If the depth of field is shallow, it is considered that the amount of focus deviation is very large. Therefore, the process transitions to the search control processing. If the depth of field is not shallow, it is considered that the contrast in the overall subject is low. Therefore, the process transitions to the wait control processing.

In step S103, if the contrast in the overall imaging area is determined to not be low, the process proceeds to step S106. In step S106, the system controller 10 determines whether the area location mode selected in the AF operative area selection processing is the mode A or the mode B. In the case of the mode A, the process proceeds to step S107. In the case of the mode B, the process proceeds to step S108.

In step S107, the system controller 10 determines the area location mode to be the mode A, and sets the AF area group 80 in the AF possibility determination area 72. Then, the wob control processing is continued. In other words, the process returns to step S101.

In step S108, the system controller 10 determines the area location mode to be the mode B, and sets the AF area group 80 in the peripheral areas 74 including a high-contrast region. Then, the wob control processing is continued. In other words, the process returns to step S101.

In step S101, if it is determined that the area location mode is known, the process proceeds to step S109. In step S109, the system controller 10 determines whether or not the lens position of the focus lens is an endpoint. If the lens position is the endpoint, the process proceeds to step S110. In step S110, the system controller 10 determines whether or not a retry should be performed. The retry means continuing an operation to achieve an in-focus condition by the wobbling drive. If the retry is performed, the wob control processing is continued. In other words, the process returns to step S101. If the retry is not performed, the process transitions to the wait control processing.

In step S109, if it is determined that the lens position is not the endpoint, the process proceeds to step S111. In step S111, the system controller 10 performs focusing determination processing. The focusing determination processing is processing to determine whether the current state is an in-focus condition, based on a drive status of the wobbling drive and a change in contrast value.

In step S112, the system controller 10 determines whether or not the current state is an in-focus condition. In the case of an in-focus condition, the process transitions to the wait control processing. In the case of a not in-focus condition, the process proceeds to step S113.

In step S113, the system controller 10 performs direction determination processing. In the direction determination processing, information relating to a direction of an in-focus position and a distance to the in-focus position is acquired.

In step S114, the system controller 10 performs change detection processing. The change detection processing is performed when the area location mode is the mode B. The change detection processing is processing to monitor appearance of a high-contrast subject in the target monitoring area 92, that is, the AF possibility determination area 72 in the mode B, and to monitor an increase or decrease in evaluation value of the contrast in the target monitoring area 92. The change detection processing will be described.

In the change detection processing, for example, three kinds of thresholds are used. The three kinds of thresholds are referred to as a first threshold, a second threshold, and a third threshold. As for the first threshold, for example, a threshold of a change rate of the contrast value in the target monitoring area 92, which is a criterion for determination whether or not the contrast value changes, is set to 30%. A threshold of a duration that represents a period in which the change continues is set to 20 frames. Thus, if the change rate of the contrast value is 30% or more, and if the contrast value continues for a period of 20 frames or more, the change is detected. As for the second threshold, the threshold of the change rate is set to 32% and the threshold of the duration is set to 12 frames. As for the third threshold, the threshold of the change rate is set to 35% and the threshold of the duration is set to 10 frames. If any of the conditions of the first to third thresholds is satisfied, it is determined that a high-contrast subject appears in the target monitoring area 92.

The first to third thresholds may be set differently, depending on a strength (frequency characteristic) of a high-pass filter for use in detection of a contrast in the target monitoring area 92. In a case of using, for example, a high-pass filter of a strength different from that of the above case, as for the first threshold, for example, the threshold of the change rate is set to 32% and the threshold of the duration is set to 20 frames. As for the second threshold, the threshold of the change rate is set to 35% and the threshold of the duration is set to 12 frames. As for the third threshold, the threshold of the change rate is set to 38% and the threshold of the duration is set to 10 frames.

Figure 10:
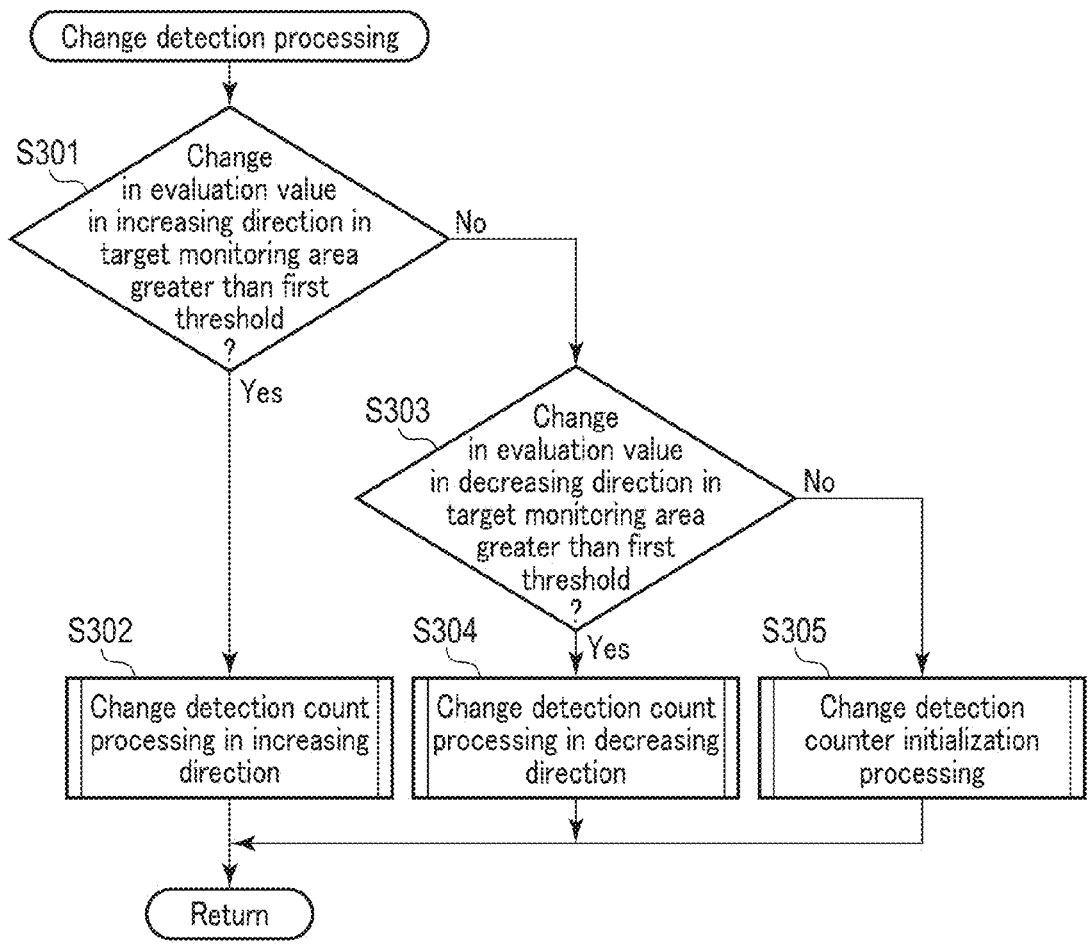
FIG. 10 is a flowchart showing an example of change detection processing.

The change detection processing will be explained with reference to the flowchart show in FIG. 10. In step S301, the system controller 10 determines whether or not the change in contrast in the increasing direction in the target monitoring area 92 is greater than the first threshold. If greater than the first threshold, the process proceeds to step S302.

Figure 11:
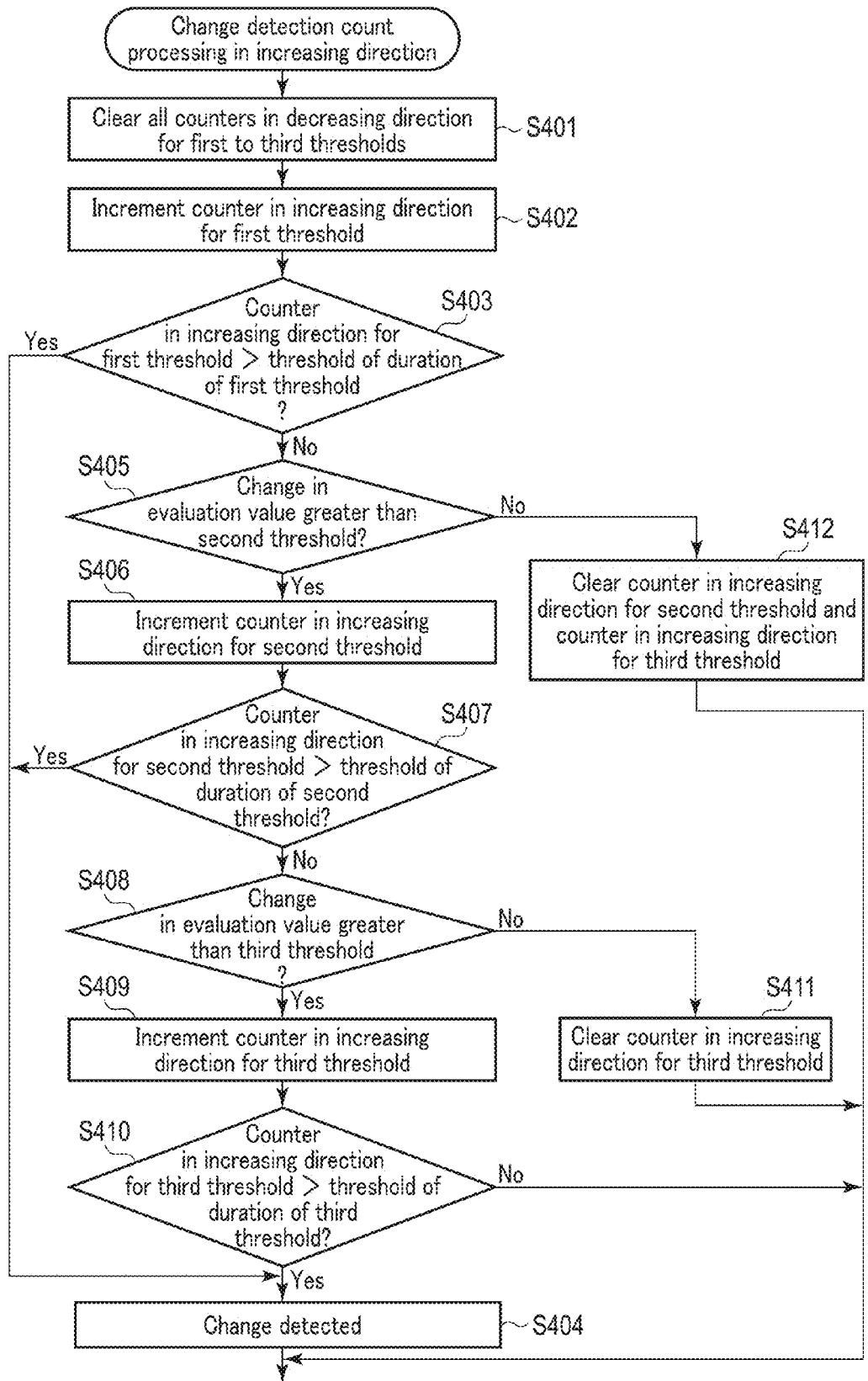
FIG. 11 is a flowchart showing an example of change detection count processing in an increasing direction.

In step S302, the system controller 10 performs change detection count processing in the increasing direction. The change detection count processing in the increasing direction is processing to determine whether or not any of the conditions of the first to third thresholds are satisfied. For this processing, six variables are prepared with respect to counters in the increasing directions for the first to third thresholds and counters in the decreasing directions for the first to third thresholds. The change detection count processing in the increasing direction will be explained with reference to FIG. 11.

In step S401, the system controller 10 clears all values of the counters in the decreasing direction for the first to third thresholds to 0. In step S402, the system controller 10 increments the counter in the increasing direction for the first threshold.

In step S403, the system controller 10 determines whether or not the value of the counter in the increasing direction for the first threshold is greater than the threshold of the duration of the first threshold. If the value of the counter for the first threshold is greater than the threshold, the process proceeds to step S404. In step S404, the system controller 10 determines that the change in the target monitoring area 92 is detected. Then, this processing is ended and the process returns to the change detection processing.

In step S403, if the value of the counter for the first threshold is not greater than the threshold, the process proceeds to step S405. In step S405, the system controller 10 determines whether or not the change in contrast in the increasing direction in the target monitoring area 92 is greater than the second threshold. If greater than the second threshold, the process proceeds to step S406.

In step S406, the system controller 10 increments the counter in the increasing direction for the second threshold. In step S407, the system controller 10 determines whether the value of the counter in the increasing direction for the second threshold is greater than the threshold of the duration of the second threshold. If the value of the counter for the second threshold is greater than the threshold, the process proceeds to step S404. If the value of the counter for the second threshold is not greater than the threshold, the process proceeds to step S408.

In step S408, the system controller 10 determines whether or not the change in contrast in the increasing direction in the target monitoring area 92 is greater than the third threshold. If greater than the third threshold, the process proceeds to step S409. In step S409, the system controller 10 increments the counter in the increasing direction for the third threshold. In step S410, the system controller 10 determines whether the value of the counter in the increasing direction for the third threshold is greater than the threshold of the duration of the third threshold. If the value of the counter for the third threshold is greater than the threshold, the process proceeds to step S404. If the value of the counter for the third threshold is not greater than the threshold, the process returns to the change detection processing.

In step S408, if the contrast change in the increasing direction in the target monitoring area 92 is determined to not be greater than the third threshold, the process proceeds to step S411. In step S411, the system controller 10 clears the counter in the increasing direction for the third threshold. Then, this processing is ended and the process returns to the change detection processing.

In step S405, if the contrast change in the increasing direction in the target monitoring area 92 is determined to not be greater than the second threshold, the process proceeds to step S412. In step S412, the system controller 10 clears the counter in the increasing direction for the second threshold and the counter in the increasing direction for the third threshold. Then, this processing is ended and the process returns to the change detection processing.

Referring back to FIG. 10, explanations of the change detection processing will be continued. After the change detection count processing in the increasing direction in step S302, the change detection processing is ended and the process returns to the wob control processing.

In step S301, if the change in contrast in the increasing direction in the target monitoring area 92 is determined to not be greater than the first threshold, the process proceeds to step S303.

In step S303, the system controller 10 determines whether or not the change in contrast in the decreasing direction in the target monitoring area 92 is greater than the first threshold. If greater than the first threshold, the process proceeds to step S304.

In step S304, the system controller 10 performs change detection count processing in the decreasing direction. The change detection count processing in the decreasing direction is processing to determine whether or not any of the conditions of the first to third thresholds are satisfied. The change detection count processing in the decreasing direction is the same as the change detection count processing in the increasing direction explained with reference to FIG. 11, except for the difference between increasing and decreasing. Therefore, explanations thereof are omitted. After the change detection count processing in the decreasing direction, the change detection processing is ended and the process returns to the wob control processing.

In step S303, if the contrast change in the decreasing direction in the target monitoring area 92 is determined to not be greater than the first threshold, the process proceeds to step S305. In step S305, the system controller 10 performs change detection counter initialization processing to clear all the counters in the increasing direction and the decreasing direction for the first to third thresholds. Then, the change detection processing is ended, and the process returns to the wob control processing.

Referring back to FIG. 8, explanations of the wob control processing will be continued. After the change detection processing in step S114, the process proceeds to step S115. In step S115, the system controller 10 determines whether the change in the target monitoring area 92 is detected by the change detection processing. If the change is detected, the process proceeds to step S116. In step S116, the system controller 10 determines the area location mode to be the mode A, and sets the AF area group 80 in the AF possibility determination area 72. Then, the wob control processing is continued. In other words, the process returns to step S101. As a result, focus adjustment is performed so that focusing is achieved in the AF possibility determination area 72.

In step S115, if it is determined that a change in the target monitoring area 92 is not detected by the change detection processing, the process proceeds to step S117. In step S117, the system controller 10 determines whether or not the process should be transitioned to the search phase. For example, if a distance to the in-focus position is determined to be longer than a predetermined value, it is determined that the process should be transitioned to the search phase. If it is determined that the process should be transitioned to the search phase, the process is transitioned to the search control processing. If it is determined that the process should not be transitioned to the search phase, the process proceeds to step S118.

In step S118, the system controller 10 determines whether or not the direction determination is conclusive in the wobbling drive, in other words, whether or not the direction of moving the focus lens is conclusively determined. If the direction determination is not conclusive, the wob control processing is continued. In other words, the process returns to step S101. If the direction determination is conclusive, the process proceeds to step S119.

In step S119, the system controller 10 updates the amount of movement in the wobbling drive. For example, since the direction of moving the focus lens is conclusively determined, the amount of movement in that direction can be increased. If the direction of current movement is opposite to the result of the direction determination, the focus lens is moved in the opposite direction. Then, the wob control processing is continued. In other words, the process returns to step S101.

Figure 12:
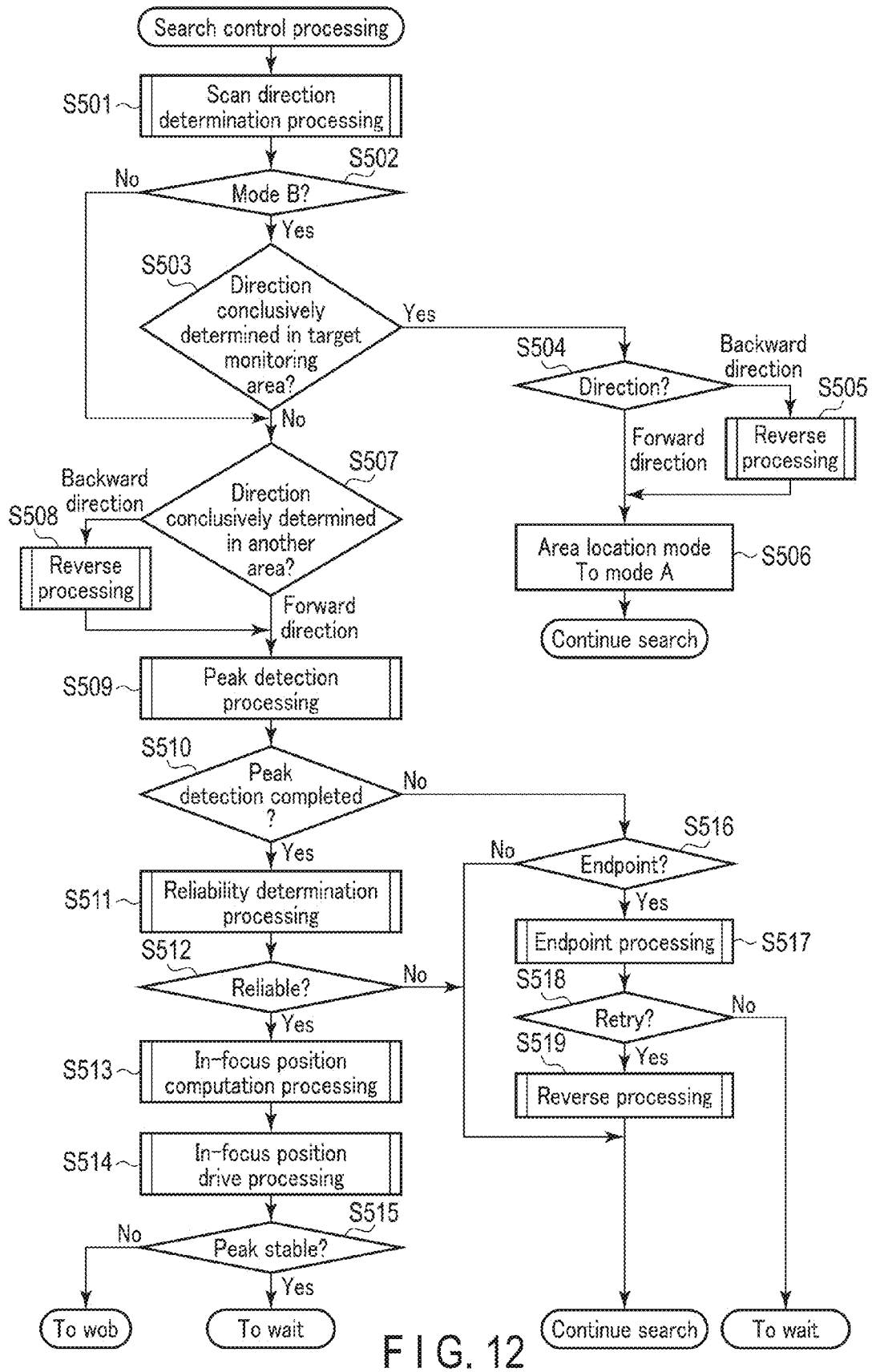
FIG. 12 is a flowchart showing an example of search control processing.

The search control processing performed in the search phase will be described with reference to the flowchart shown in FIG. 12.

Figure 13:
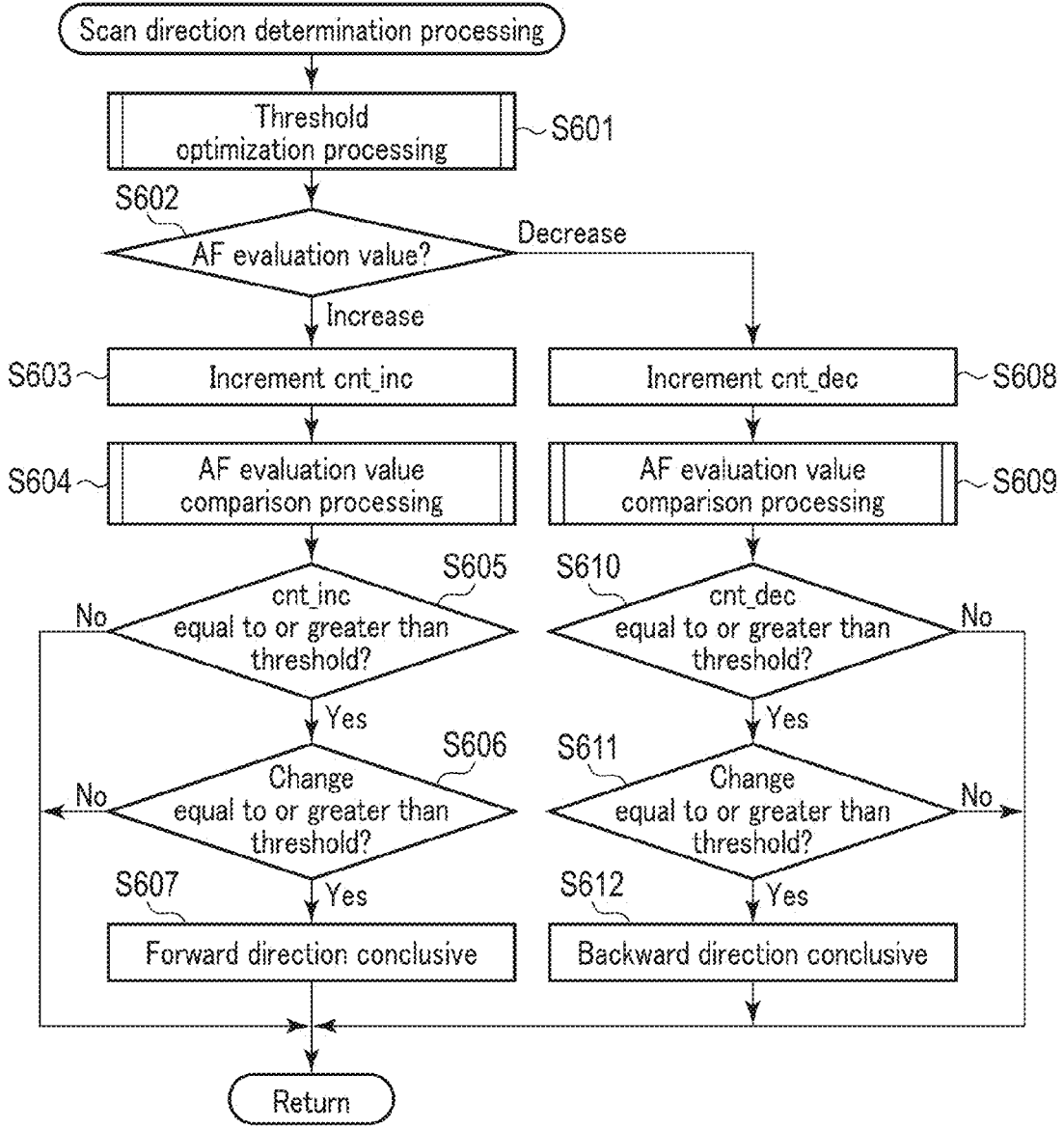
FIG. 13 is a flowchart showing an example of scan direction determination processing.

In step S501, the system controller 10 starts a scan drive, and in the scan drive, performs scan direction determination processing to determine the direction of movement of the focus lens in each of the AF area group 80, the peripheral areas 74, and the target monitoring area 92. The scan direction determination processing will be explained with reference to the flowchart shown in FIG. 13.

In step S601, the system controller 10 performs threshold optimization processing to optimize various thresholds for use in the subsequent determination. In step S602, the system controller 10 determines whether the AF evaluation value relating to the contrast value increases or decreases.

If the AF evaluation value increases, the process proceeds to step S603. In step S603, the system controller 10 increments a variable cnt_inc to count the increase of the AF evaluation value. In step S604, the system controller 10 performs comparison processing for the AF evaluation value that evaluates a change in the AF evaluation value.

In step S605, the system controller 10 determines whether a counter cnt_inc is equal to or greater than a predetermined threshold set in step S601. If the counter is not equal to or greater than the threshold, the scan direction determination processing is ended, and the process returns to the search control processing. If the counter is equal to or greater than the threshold, the process proceeds to step S606.

In step S606, the system controller 10 determines whether or not there is a change equal to or greater than the predetermined threshold that was set in step S601 regarding the AF evaluation value. If there is no change that is equal to or greater than the threshold, the scan direction determination processing is ended, and the process returns to the search control processing. If there is a change that is equal to or greater than the threshold, the process proceeds to step S607. In step S607, the system controller 10 conclusively determines that the scan direction is a forward direction, that is, the current direction. Then, the scan direction determination processing is ended, and the process returns to the search control processing.

In step S602, if it is determined that the AF evaluation value decreases, the process proceeds to step 608. In step S608, the system controller 10 increments a variable cnt_dec to count the decrease of the AF evaluation value. In step S609, the system controller 10 performs comparison processing for the AF evaluation value that evaluates a change in the AF evaluation value.

In step S610, the system controller 10 determines whether the counter cnt_dec is equal to or greater than a predetermined threshold set in step S601. If the counter is not equal to or greater than the threshold, the scan direction determination processing is ended, and the process returns to the search control processing. If the counter is equal to or greater than the threshold, the process proceeds to step S611.

In step S611, the system controller 10 determines whether or not there is a change equal to or greater than the predetermined threshold that was set in step S601 regarding the AF evaluation value. If there is no change that is equal to or greater than the threshold, the scan direction determination processing is ended, and the process returns to the search control processing. If there is a change equal to or greater than the threshold, the process proceeds to step S612. In step S612, the system controller 10 conclusively determines that the scan direction is a backward direction, which is opposite to the current direction. Then, the scan direction determination processing is ended, and the process returns to the search control processing.

Thus, in the scan direction determination processing, if both of the counter and the change are equal to or greater than the predetermined thresholds, it is conclusively determined that the scan direction is the forward direction or the backward direction.

Referring back to FIG. 12, explanations of the search control processing are continued. After the scan direction determination processing in step S501, the process proceeds to step S502. In step S502, the system controller 10 determines whether or not the area location mode is the mode B.

If the mode is not the mode B, the process proceeds to step S507. If the area location mode is the mode B, the process proceeds to step S503.

In step S503, the system controller 10 determines whether the scan direction is conclusively determined in the target monitoring area 92 with reference to the result of the scan direction determination processing in step S501. If the scan direction is not conclusively determined in the target monitoring area 92, the process proceeds to step S507. If the scan direction is conclusively determined in the target monitoring area 92, the process proceeds to step S504.

In step S504, the system controller 10 determines a direction in which the scan drive should be performed. If the scan direction is conclusively determined to be the forward direction, the process proceeds to step S506. If the scan direction is conclusively determined to be the backward direction, the process proceeds to step S505. In step S505, the system controller 10 performs reverse processing to reverse the scan direction. Then, the process proceeds to step S506.

In step S506, the system controller 10 changes the area location mode, which is currently the mode B, to the mode A. Thus, the AF area group 80 is set in the target monitoring area 92. Then, the search control processing is continued. In other words, the process returns to step S501.

In step S507, the system controller 10 determines whether the scan direction is conclusively determined in the AF area group 80 or the other peripheral areas 74. If the scan direction is conclusively determined to be the backward direction, the process proceeds to step S508. In step S508, the system controller 10 performs reverse processing to reverse the scan direction. Then, the process proceeds to step S509. In step S507, if the scan direction is not conclusively determined to be the backward direction, that is, if the scan direction is conclusively determined to be the forward direction or the scan direction is not conclusively determined, the process proceeds to step S509.

In step S509, the system controller 10 performs peak detection processing to detect a peak position of a contrast value. In the peak detection processing, whether a contrast value, which is an AF evaluation value, is decreased from a maximum value is monitored, thereby detecting a peak of the contrast value. In step S510, the system controller 10 determines whether or not the peak position is detected. If the peak position is detected, the process proceeds to step S511.

In step S511, the system controller 10 performs reliability determination processing to determine the reliability of a peak value of the contrast detected in step S509.

In step S512, the system controller 10 determines whether or not the detected peak value is reliable. If the peak value is determined to not be reliable, the search control processing is continued. In other words, the process returns to step S501. If it is determined that the peak value is reliable, the process proceeds to step S513.

In step S513, the system controller 10 performs in-focus position computation processing to determine an in-focus position by computation based on the detected peak value of the contrast. In step S514, the system controller 10 performs in-focus position drive processing to move the lens to the in-focus position computed in step S513.

In step S515, the system controller 10 determines whether or not the peak value of the contrast obtained as a result of moving the lens to the in-focus position is extremely stable. If the peak value is stable, the process transitions to the wait control processing. If the peak value is not stable, the process transitions to the wob control processing to perform fine adjustment of the focus.

In step S510, if it is determined that a peak position is not detected, the process proceeds to step S516. In step S516, the system controller 10 determines whether or not the lens position is an endpoint. If the lens position is not the endpoint, the search control processing is continued. In other words, the process returns to step S501. If it is determined that the lens position is the endpoint, the process proceeds to step S517.

In step S517, the system controller 10 performs endpoint processing that relates to whether or not peak detection should be continued with the scan direction reversed. In step S518, the system controller 10 determines whether or not a scan drive should be retried as a result of the endpoint processing in step S517. If the retry is not performed, the process transitions to the wait control processing. In the retry is performed, the process proceeds to step S519. In step S519, the system controller 10 performs reverse processing. Then, the search control processing is continued. In other words, the process returns to step S501.

Figure 14:
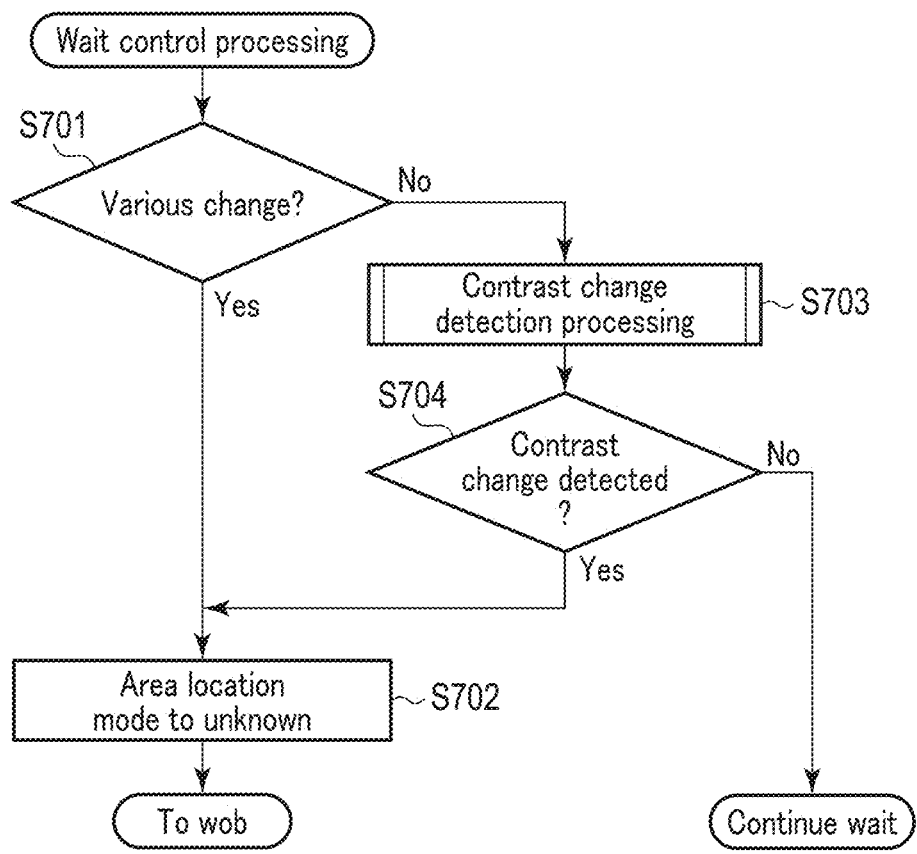
FIG. 14 is a flowchart showing an example of wait control processing.

The wait control processing will be explained with reference to the flowchart show in FIG. 14.

In step S701, the system controller 10 determines whether there is a change in various states. For example, the following can be detected as a change: a touch on the touch panel 26; detection of a face in the subject or disappearance of the detected face; acquisition or loss of a specific subject in tracking; detection of a change in position of the imaging device 1 by the gyro-sensor circuit 28; and a zoom operation of the lens group 21. If it is determined that there is a change in state, the process proceeds to step S702.

In step S702, the system controller 10 sets the area location mode to be unknown. Then, the process transitions to the wob control processing.

In step S701, if it is determined that there is no change in state, the process proceeds to step S703. In step S703, the system controller 10 performs contrast change detection processing. The contrast change detection processing is similar to the change detection processing described above with reference to FIG. 10. However, the contrast change detection processing in the wait control processing individually detects a change in contrast in the AF area group 80 and a change in contrast in the target monitoring area 92. Furthermore, these detections are performed for two different high-pass filters.

Figure 15:
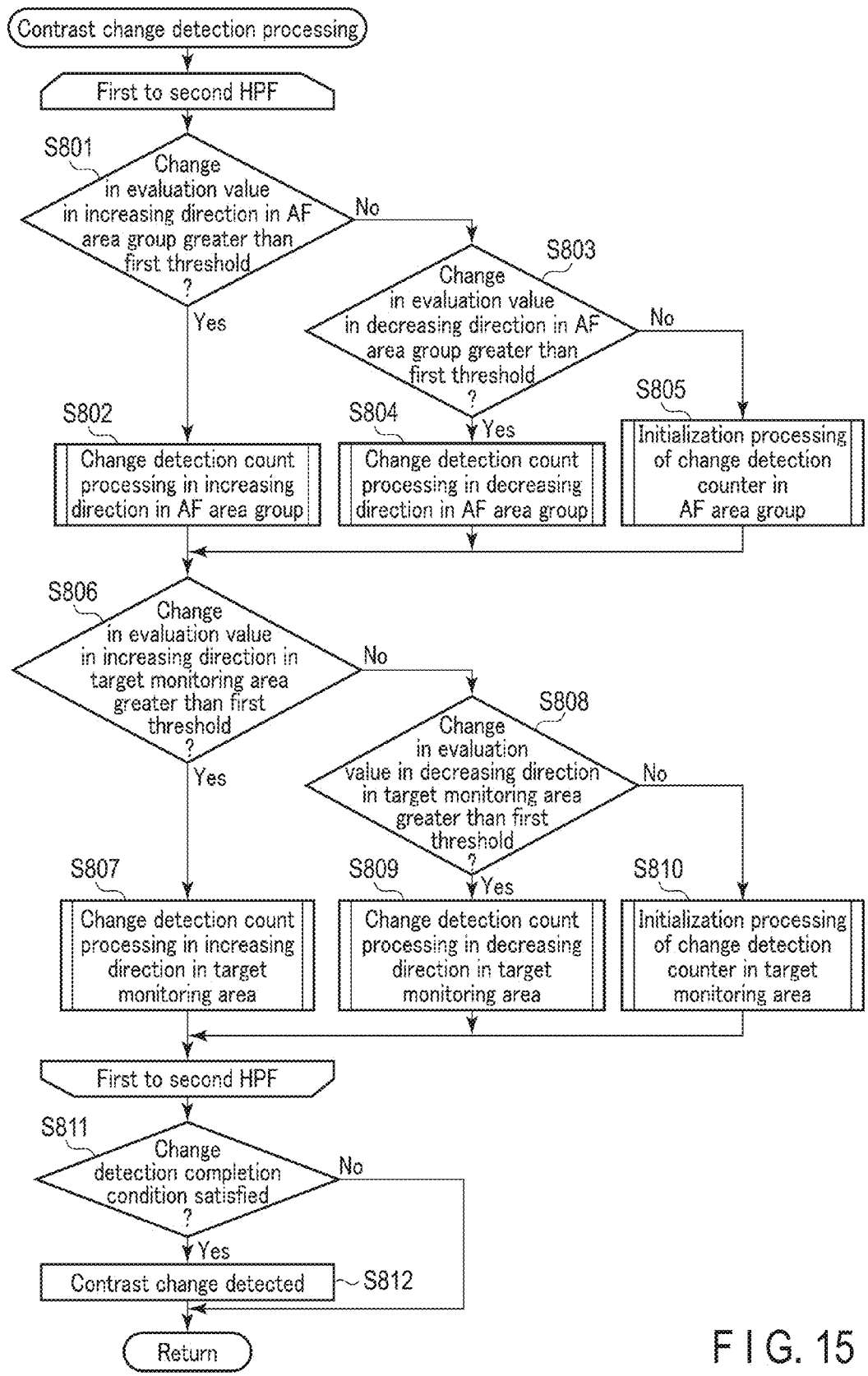
FIG. 15 is a flowchart showing an example of contrast change detection processing.

The contrast change detection processing will be explained with reference to the flowchart show in FIG. 15. Processes in step S801 to step S810 are performed for a first high-pass filter (HPF) and a second high-pass filter (HPF).

In step S801, the system controller 10 determines whether or not a change in evaluation value in the increasing direction in the AF area group 80 is greater than the first threshold. If greater than the first threshold, the process proceeds to step S802. In step S802, the system controller 10 performs change detection count processing in the increasing direction in the AF area group 80. The processing is similar to the processing described above with reference to FIG. 11. Then, the process proceeds to step S806.

In step S801, if the change in evaluation value in the increasing direction is determined to not be greater than the first threshold, the process proceeds to step S803. In step S803, the system controller 10 determines whether or not the change in evaluation value in the decreasing direction in the AF area group 80 is greater than the first threshold. If greater than the first threshold, the process proceeds to step S804. In step S804, the system controller 10 performs change detection count processing in the decreasing direction in the AF area group 80. The processing is similar to the processing described above with reference to FIG. 11. Then, the process proceeds to step S806.

In step S803, if the change in evaluation value in the decreasing direction is determined to not be greater than the first threshold, the process proceeds to step S805. In step S805, the system controller 10 performs initialization processing of the change detection counter in the AF area group 80. Specifically, the system controller 10 zeros the counters in the increasing direction for the first to third thresholds and the counters in the decreasing direction for the first to third thresholds for the AF area group 80. Then, the process proceeds to step S806.

In step S806, the system controller 10 determines whether or not a change in evaluation value in the increasing direction in the target monitoring area 92 is greater than the first threshold. If greater than the first threshold, the process proceeds to step S807. In step S807, the system controller 10 performs change detection count processing in the increasing direction in the target monitoring area 92. The processing is similar to the processing described above with reference to FIG. 11. Then, the process proceeds to step S811.

In step S806, if the change in evaluation value in the increasing direction is determined to not be greater than the first threshold, the process proceeds to step S808. In step S808, the system controller 10 determines whether or not a change in evaluation value in the decreasing direction in the target monitoring area 92 is greater than the first threshold. If greater than the first threshold, the process proceeds to step S809. In step S809, the system controller 10 performs change detection count processing in the decreasing direction in the AF area group. The processing is similar to the processing described above with reference to FIG. 11. Then, the process proceeds to step S811.

In step S808, if the change in evaluation value in the decreasing direction is determined to not be greater than the first threshold, the process proceeds to step S810. In step S810, the system controller 10 performs initialization processing of the change detection counter in the target monitoring area 92. Specifically, the system controller 10 zeros the counters in the increasing direction for the first to third thresholds and the counters in the decreasing direction for the first to third thresholds for the target monitoring area 92. Then, the process proceeds to step S811.

In step S811, the system controller 10 determines whether or not a change detection completion condition is satisfied. The change detection completion condition is satisfied when a change in contrast in the AF area group 80 or the target monitoring area 92 is detected. If the change detection completion condition is not satisfied, the contrast change detection processing is ended and the process returns to the wait control processing. If the change detection completion condition is satisfied, the process proceeds to step S812.

In step S812, the system controller 10 conclusively determines that a contrast change is detected. Then, the contrast change detection processing is ended, and the process returns to the wait control processing.

Referring back to FIG. 14, explanations of the wait control processing will be continued. After the contrast change detection processing, the process proceeds to step S704. In step S704, the system controller 10 determines whether a contrast change is detected in the contrast change detection processing. If the contrast change is detected, the process proceeds to step S702. If the contrast change is not detected, the wait control processing is continued. In other words, the process returns to step S701. Thus, if the change occurs, the phase transitions to the wobbling phase, and if no change occurs, the wait phase is maintained.

FIG. 16 is a diagram for explaining an outline of a state transition of the area location modes in the processing described above. As shown in the diagram, when the wait phase transitions to another phase, the area location mode is unknown. If there is a contrast in the AF possibility determination area 72 when the area location mode is unknown, the area location mode is set to the mode A. If the AF possibility determination area 72 has a low contrast, the area location mode is set to the mode B. When the area location mode is the mode B, if a contrast appears in the target monitoring area 92, the area location mode is set to the mode A.

Figure 17:
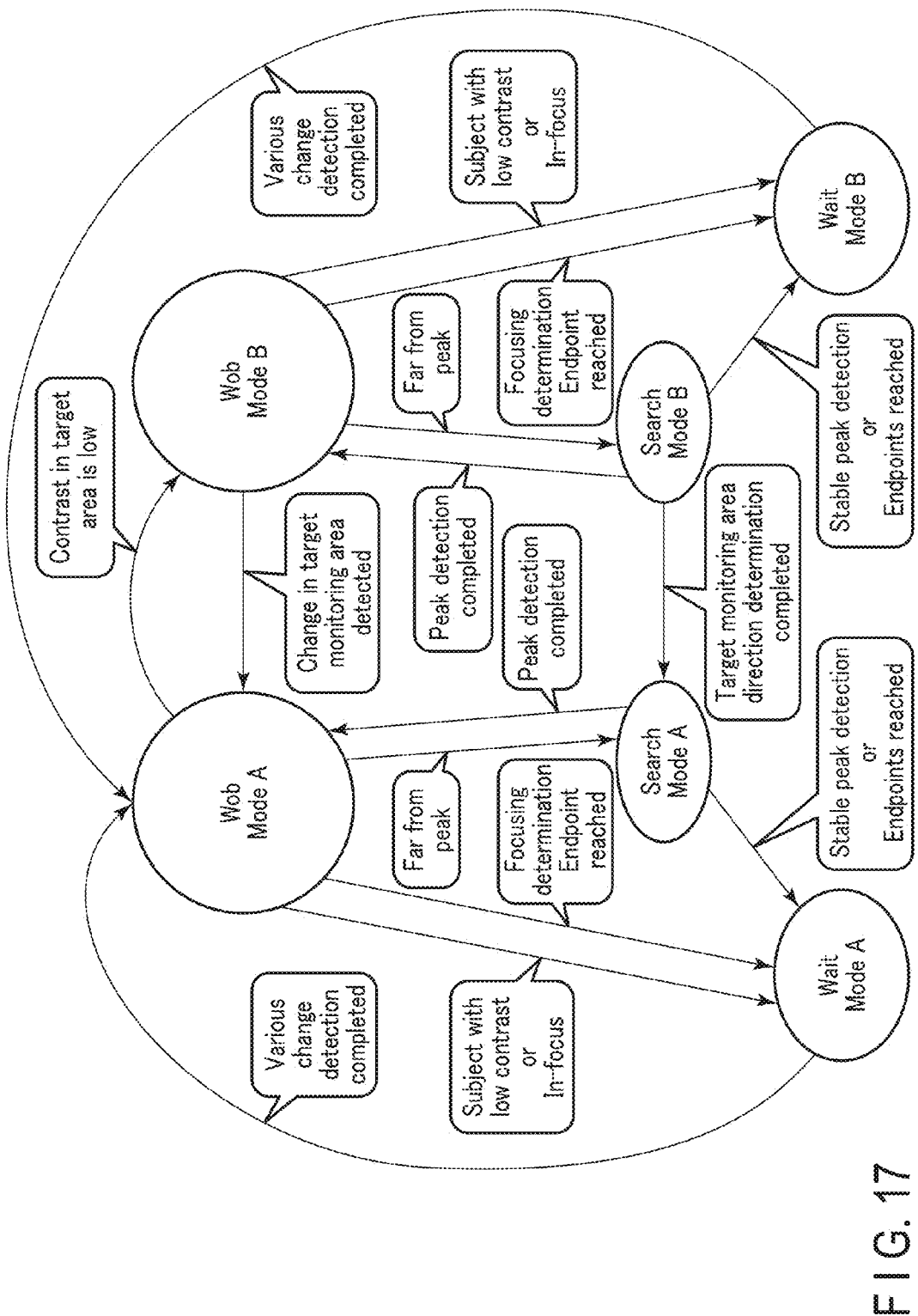
FIG. 17 is a diagram for explaining an outline of a state transition among the wob phase, the search phase, and the wait phase, and area location modes in each phase.

FIG. 17 is a state transition diagram for explaining an outline of the relationship between a state transition among the wob phase, the search phase, and the wait phase, and the area location modes in each phase. As shown in FIG. 17, the process transitions between phases and between modes in accordance with predetermined conditions.

Specifically, in the mode A of the wobbling phase, if it becomes clear that the in-focus position is far, the process is shifted to the mode A of the search phase. If the subject has a very low contrast or is at the in-focus position, or the lens position reaches the endpoints and retry is not performed, the process is shifted to the mode A of the wait phase. If the contrast of the AF possibility determination area 72 is low, the process is shifted to the mode B of the wobbling phase.

In the mode A of the search phase, if the peak value of a contrast is detected, the process is shifted to the mode A of the wobbling phase. If the in-focus condition is stable, or the lens reaches the endpoints and retry is not performed, the process is shifted to the mode A of the wait phase.

In the mode A of the wait phase, if various changes are detected, the process is shifted to the mode A of the wobbling phase.

In the mode B of the wobbling phase, if it becomes clear that the in-focus position is far, the process is shifted to the mode B of the search phase. If the subject has a very low contrast or is at the in-focus position, or the lens position reaches the endpoints and retry is not performed, the process is shifted to the mode B of the wait phase. If a contrast appears in the target monitoring area 92, the process is shifted to the mode A of the wobbling phase.

In the mode B of the search phase, if the peak value of a contrast is detected, the process is shifted to the mode B of the wobbling phase. If the in-focus condition is stable, or the lens reaches the endpoints and retry is not performed, the process is shifted to the mode B of the wait phase. If a direction of the in-focus position is determined in the target monitoring area 92, the process is shifted to the mode A of the search phase.

In the mode B of the wait phase, if various changes are detected, the process is shifted to the mode A of the wobbling phase.

Figure 18:
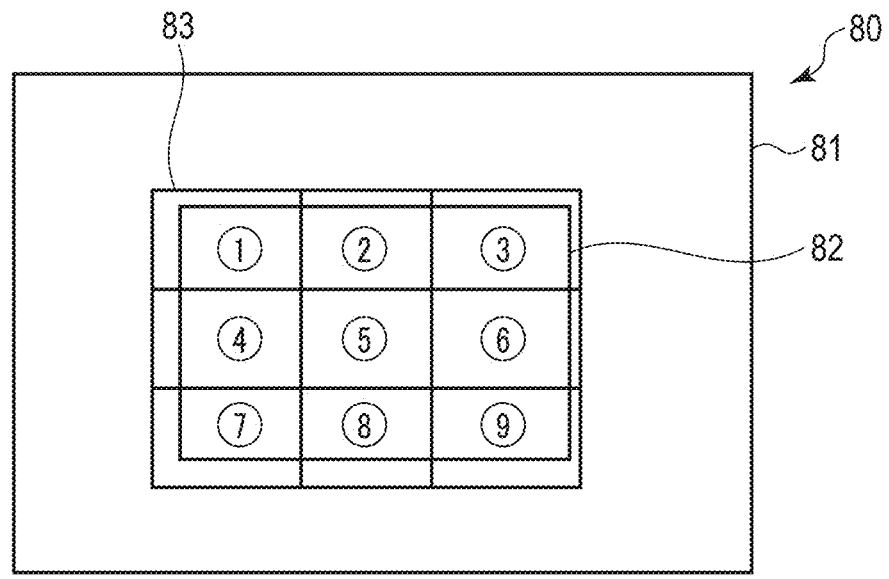
FIG. 18 is a diagram for explaining an example of an AF area group in the wob phase.
Figure 19:
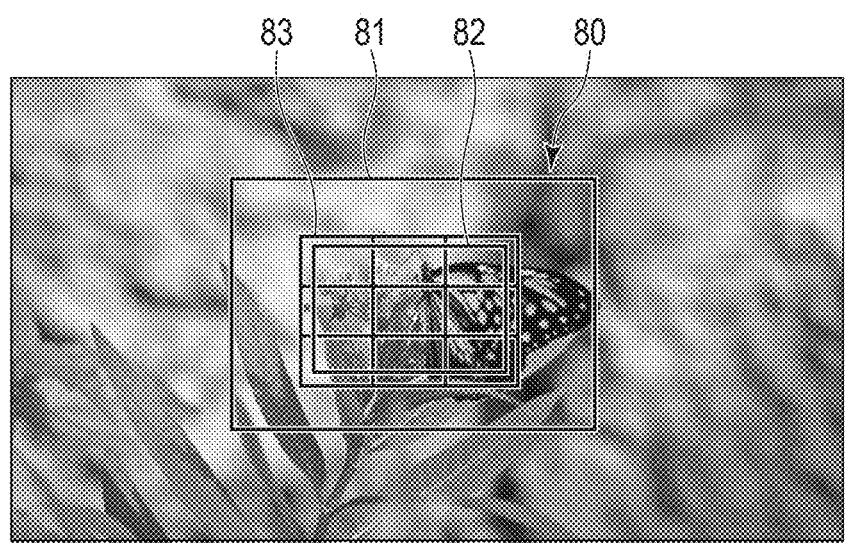
FIG. 19 is a view for explaining an effect obtained by using the AF area group.

An example of the AF area group 80 for use in the wob control processing will be explained with reference to FIG. 18. The AF area group 80 for use in the wob control processing includes a large area 81, a middle area 82, and nine small areas 83. Using the eleven AF areas in combination, AF operations suitable for various subjects can be performed. For example, even if the large area 81 and the middle area 82 include a near subject and a far subject as shown in FIG. 19, an accurate focusing can be achieved by using the small areas 83. Therefore, results of determination of an in-focus direction or an in-focus position in the small areas 83 preferably have higher priority than results of determination in the large area 81 or the middle area 82. If a state transitions to a next state, the area used for determining a direction is preferably used as a center of the AF area group 80 in the next state. Furthermore, the AF area group 80 shown in FIG. 18 may be adopted in the wait control processing.

Figure 20:
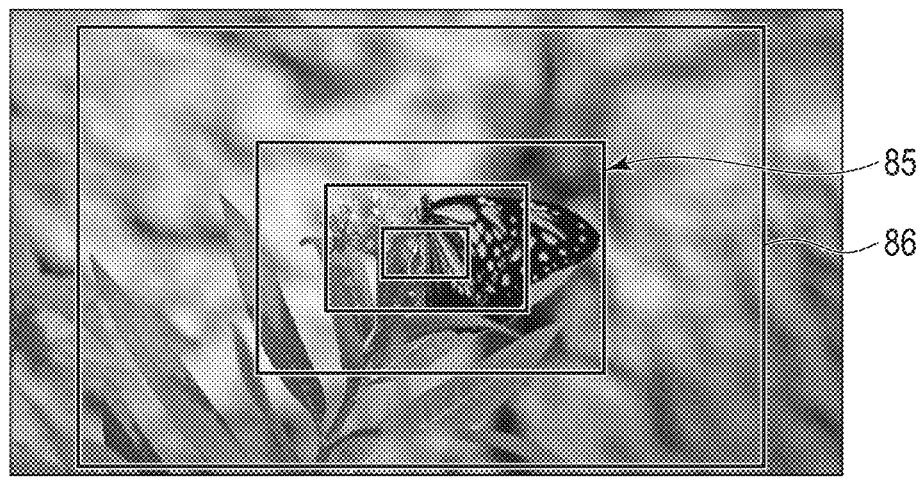
FIG. 20 is a view for explaining an effect obtained by using the AF area group in the search phase.

An example of the AF area group 80 for use in the search control processing will be explained with reference to FIG. 20. The AF area group 80 for use in the search control processing includes a plurality of AF areas 85, and a full cover area 86. The full cover area 86 is used secondarily. For example, when the lens position reaches the endpoint while a peak is not detected in the AF area 85, a peak is detected in the full cover area, and the lens is moved to the detected position. Furthermore, the AF area group 80 shown in FIG. 20 may be adopted in the wait control processing.

Figure 21:
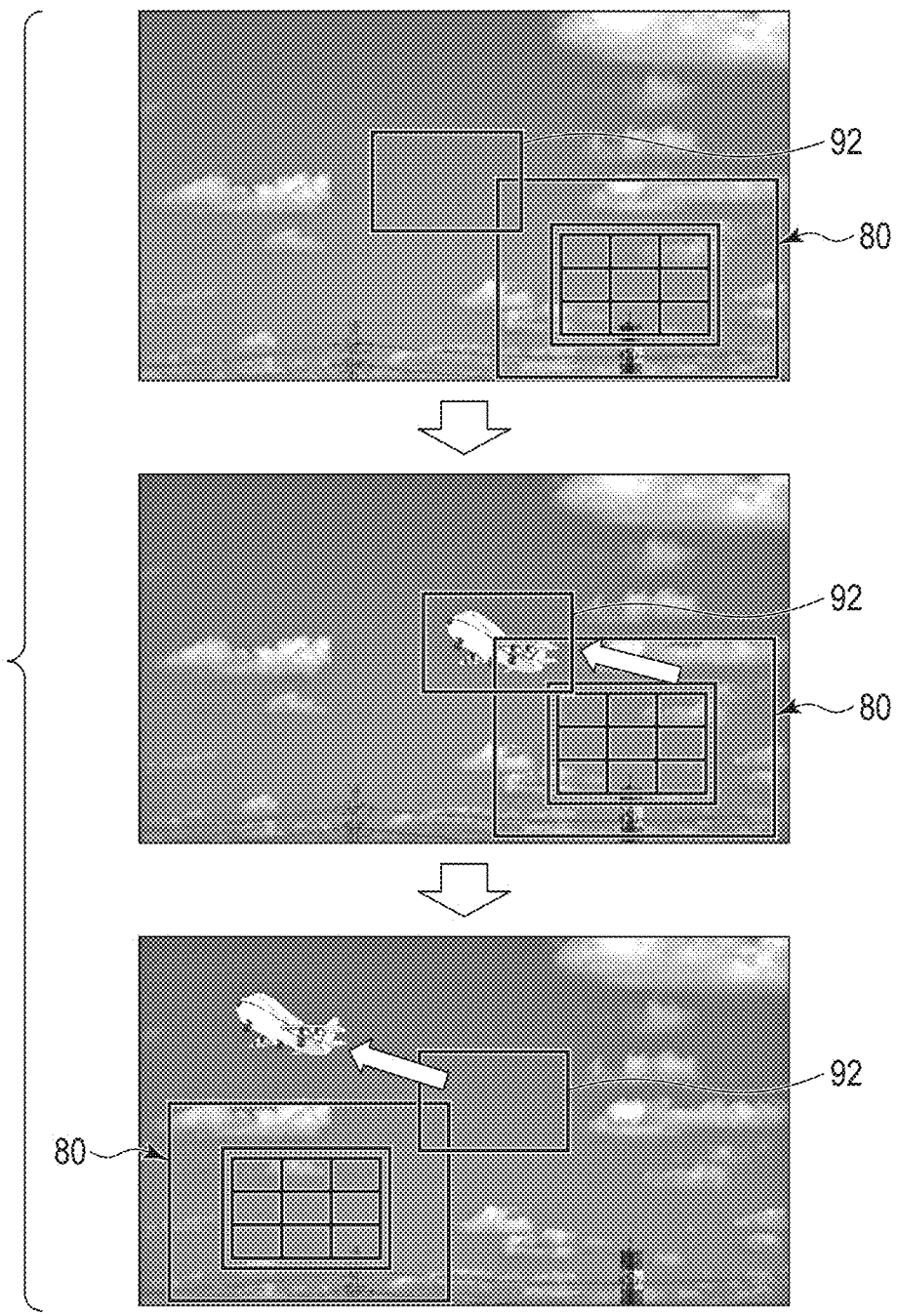
FIG. 21 is a view for explaining an effect of the change detection processing etc.

An effect of the change detection processing in the wob control processing, for example, explained with reference to FIG. 10, will be explained with reference to FIG. 21. If the contrast in the target monitoring area 92 is low as shown in the view at the top in FIG. 21, the AF area group 80 is set in a part of the peripheral areas 74 that has a contrast. Here, as shown in second and third views from the top in FIG. 21, even if there is a subject that passes the target monitoring area 92 in a short period of time, the area location mode does not transition from the mode B to the mode A for the passing subject by appropriately setting an elapsed time threshold. As a result, an effect of not causing an unnecessary lens drive is obtained. A similar effect is also obtained in the contrast change detection processing in the search control processing.

Figure 23:
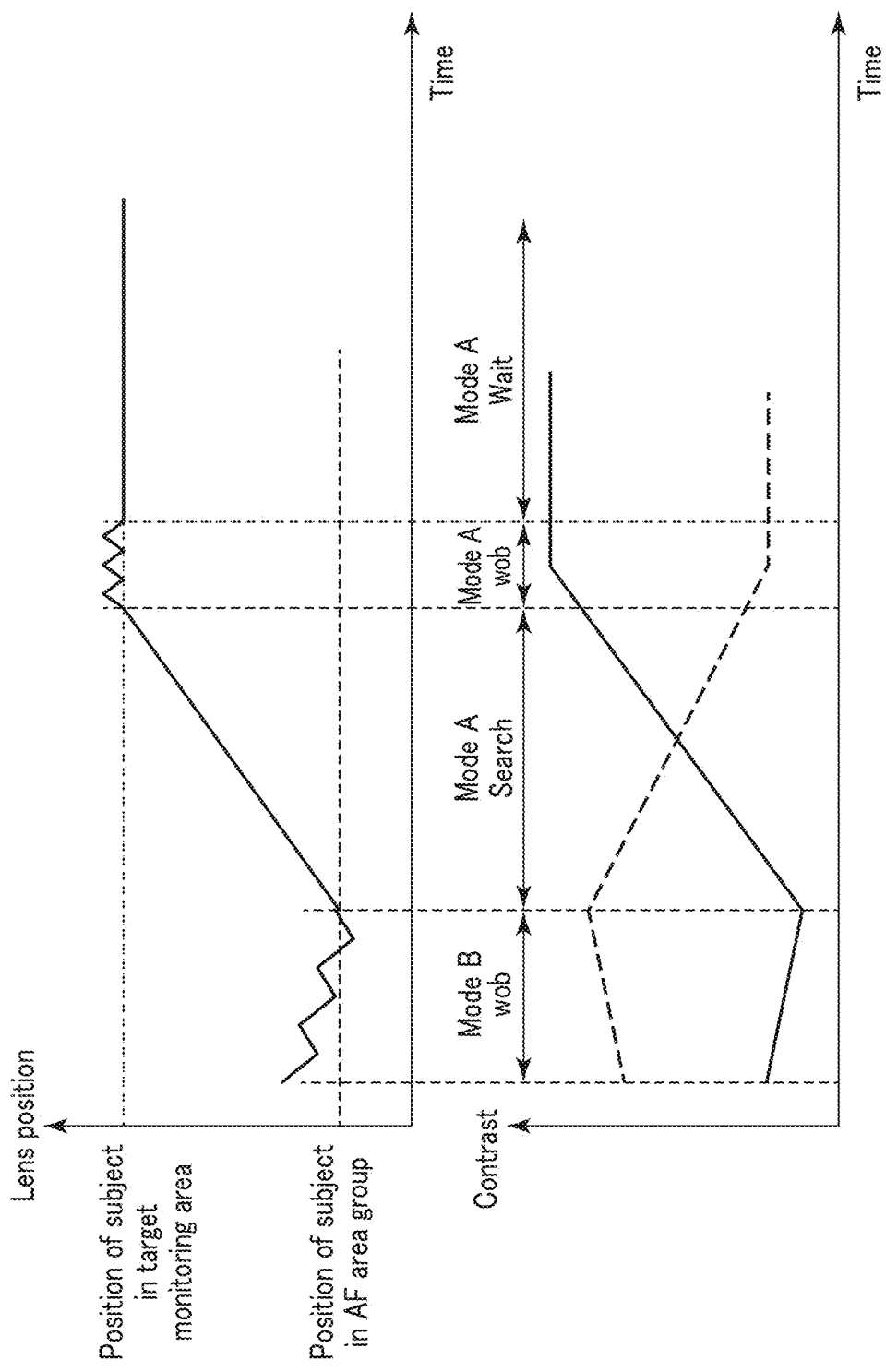
FIG. 23 is a view for explaining an effect of the change detection processing etc.

Another effect of the change detection processing in the wob control processing, for example, explained with reference to FIG. 10, will be explained with reference to FIG. 22 and FIG. 23. For example, a subject as shown in FIG. 22 is assumed. In this case, it is assumed that the subject included in the target monitoring area 92 is exceedingly defocused and has a low contrast. At this time, the AF area group 80 is set in the peripheral areas 74. A change of the lens position with respect to time in this state is shown in an upper diagram in FIG. 23, and a change of the contrast with respect to time is shown in a lower diagram in FIG. 23. In the lower diagram in FIG. 23, a solid line represents a change of the contrast in the target monitoring area 92, and a broken line represents a change of the contrast in the AF area group 80. As shown in FIG. 23, when the area location mode is the mode B and the wobbling drive is performed to achieve focusing in the AF area group 80, a change of the contrast occurs in the target monitoring area 92 because the area also includes a subject. When the change of the contrast exceeds a predetermined threshold, the area location mode is switched to the mode A. Thus, the AF area group 80 is set in the target monitoring area 92, which is the AF possibility determination area 72, and the focusing can be achieved for the subject in the target monitoring area 92.

The same applies to the search control processing. Similarly to FIG. 23, a change of the lens position with respect to time in the search control processing is shown in an upper diagram in FIG. 24, and a change of the contrast with respect to time is shown in a lower diagram in FIG. 24. In the lower diagram in FIG. 24, a solid line represents a change of the contrast in the target monitoring area 92, and a broken line represents a change of the contrast in the AF area group 80. In this case also, when the area location mode is the mode B and the scan drive is performed to achieve focusing in the AF area group 80, a change of the contrast occurs in the target monitoring area 92 because the area also includes a subject. When the change of the contrast exceeds a predetermined threshold, the area location mode is switched to the mode A. Thus, the AF area group 80 is set in the target monitoring area 92, which is the AF possibility determination area 72, and the focusing is achieved for the subject in the target monitoring area 92.

According to the embodiment, when the contrast in the AF possibility determination area 72, which the user sets, is high, or when the contrast in the AF possibility determination area 72, optionally set in all target AF, is high, AF operation is performed with the AF area group 80 set in the AF possibility determination area 72. On the other hand, when the contrast in the AF possibility determination area 72 is low, AF operation is performed with the AF area group 80 set in the peripheral areas 74. Therefore, the lens is prevented from making large movements for focusing in an area where there is no contrast. According to the embodiment, stable autofocus can be achieved.

Furthermore, when the AF area group 80 is set in the peripheral areas 74, the target monitoring area 92 is provided in the AF possibility determination area 72 to monitor appearance of a contrast. Therefore, when a contrast appears in the target monitoring area 92 and focusing can be achieved in this area, the AF area group 80 can be immediately set again in the target monitoring area 92. Thus, appropriate focusing can be achieved in the AF possibility determination area 72 which the user sets. According to the embodiment, autofocus of high tracking performance can be achieved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An imaging device comprising:
    an imaging section that receives a subject image to capture, and generates image data;
    an image capture optical system that forms the subject image on an imaging surface of the imaging section and includes a focus lens for focus adjustment; and
    a controller that controls movement of the focus lens based on the image data and performs a focus adjustment operation, wherein:
    the controller sets in an image represented by the image data a first focus adjustment region, which is a target of adjustment of focusing conditions, and a second focus adjustment region, which is a target of adjustment of focusing conditions and has a lower priority of adjustment of focusing than the first focus adjustment region;
    the controller determines whether or not focus adjustment based on image data in the first focus adjustment region is difficult;
    the controller performs focus adjustment based on image data in the second focus adjustment region, if the focus adjustment based on the image data in the first focus adjustment region is difficult;
    the controller repeatedly determines whether or not the focus adjustment based on the image data in the first focus adjustment region is difficult, while performing the focus adjustment based on the image data in the second focus adjustment region; and the controller stops the focus adjustment based on the image data in the second focus adjustment region and performs the focus adjustment based on the image data in the first focus adjustment region, if the focus adjustment based on the image data in the first focus adjustment region is not difficult, wherein the controller measures a duration in which the focus adjustment based on the image data in the first focus adjustment region is determined to not be difficult, and if the duration is longer than a predetermined period of time, the controller stops the focus adjustment based on the image data in the second focus adjustment region and performs the focus adjustment based on the image data in the first focus adjustment region.

2. The imaging device according to claim 1, wherein while the controller detects an evaluation value based on the image data in the second focus adjustment region and performs focus adjustment, if a change of an evaluation value based on the image data in the first focus adjustment region of a predetermined value or more is detected, the controller stops the focus adjustment based on the image data in the second focus adjustment region and performs the focus adjustment based on the image data in the first focus adjustment region.

3. The imaging device according to claim 1, wherein:

the controller is configured to perform a wobbling operation to cause the imaging section to acquire the image data while the focus lens is moved in an optical axis direction of the image capture optical system in a predetermined cycle; and while the controller detects an evaluation value relating to the focusing conditions based on the image data in the second focus adjustment region acquired through the wobbling operation and performs focus adjustment, if a change of the evaluation value based on the image data in the first focus adjustment region of a predetermined value or more acquired through the wobbling operation is detected, the controller stops the focus adjustment based on the image data in the second focus adjustment region and performs the focus adjustment based on the image data in the first focus adjustment region.

4. The imaging device according to claim 1, wherein:

the controller is configured to perform a scan operation to cause the imaging section to acquire the image data while moving the focus lens in a predetermined direction, thereby determining a direction in which an in-focus position is present; and while the controller detects an evaluation value based on the image data in the second focus adjustment region acquired through the scan operation and performs focus adjustment, if the direction in which the in-focus position is present is determined based on the image data in the first focus adjustment region acquired through the scan operation, the controller stops the focus adjustment based on the image data in the second focus adjustment region and performs the focus adjustment based on the image data in the first focus adjustment region.

5. An imaging method, using an imaging device comprising an imaging section that receives a subject image to capture, and generates image data, an image capture optical system that forms the subject image on an imaging surface of the imaging section and includes a focus lens for focus adjustment, and a controller that controls movement of the focus lens based on the image data and performs a focus adjustment operation, the method comprising:

setting in an image represented by the image data a first focus adjustment region, which is a target of adjustment of focusing conditions, and a second focus adjustment region, which is a target of adjustment of focusing conditions and has a lower priority of adjustment of focusing than the first focus adjustment region;

determining whether or not focus adjustment based on image data in the first focus adjustment region is difficult;

performing focus adjustment based on image data in the second focus adjustment region, if the focus adjustment based on the image data in the first focus adjustment region is difficult;

repeatedly determining whether or not the focus adjustment based on the image data in the first focus adjustment region is difficult, while performing focus adjustment based on the image data in the second focus adjustment region;

stopping the focus adjustment based on the image data in the second focus adjustment region and performs the focus adjustment based on the image data in the first focus adjustment region, if the focus adjustment based on the image data in the first focus adjustment region is not difficult;

measuring, with the controller, a duration in which the focus adjustment based on the image data in the first focus adjustment region is determined to not be difficult; and responsive to a determination that the duration is longer than a predetermined period of time, stopping, with the controller, the focus adjustment based on the image data in the second focus adjustment region and performing the focus adjustment based on the image data in the first focus adjustment region.

* * * * *